(12) United States Patent
Lee

(10) Patent No.: US 12,405,342 B2
(45) Date of Patent: Sep. 2, 2025

(54) METHOD OF TRANSMITTING AND RECEIVING INFORMATION FOR MEASUREMENT OF PRS IN WIRELESS COMMUNICATION SYSTEM AND APPARATUS THEREFOR

(71) Applicant: LG ELECTRONICS INC., Seoul (KR)

(72) Inventor: Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 375 days.

(21) Appl. No.: 18/098,269

(22) Filed: Jan. 18, 2023

(65) Prior Publication Data

US 2023/0258760 A1 Aug. 17, 2023

Related U.S. Application Data

(60) Provisional application No. 63/309,555, filed on Feb. 13, 2022.

(51) Int. Cl.
*G01S 5/00* (2006.01)
*G01S 13/76* (2006.01)

(52) U.S. Cl.
CPC .......... *G01S 5/0036* (2013.01); *G01S 5/0045* (2013.01); *G01S 13/765* (2013.01)

(58) Field of Classification Search
CPC .... G01S 5/0036; G01S 5/0045; G01S 13/765; G01S 5/0236; G01S 5/0205; G01S 5/04;
(Continued)

(56) References Cited

U.S. PATENT DOCUMENTS 11,777,676 B2 * 10/2023 Da ................. H04W 4/02
370/330
2016/0095092 A1 * 3/2016 Khoryaev ......... H04W 8/005
370/329
(Continued)

FOREIGN PATENT DOCUMENTS

CN 110178326 B * 4/2022 ........... H04B 7/0456
CN 116710806 A * 9/2023 ............. G01S 13/42
(Continued)

OTHER PUBLICATIONS

Qualcomm Incorporated, "Assistance Data for DL-only UE-based mode," 3GPP TSG-RAN WG2, R2-1915563, 14 pages, Nov. 2019.
(Continued)

*Primary Examiner* — Mahendra R Patel
(74) *Attorney, Agent, or Firm* — BRYAN CAVE LEIGHTON PAISNER LLP

(57) ABSTRACT

A method for a user equipment to transmit information for measurement of a positioning reference signal (PRS) in a wireless communication system according to an embodiment of the present disclosure, the method comprises receiving, from a location server, configuration information related to the PRS, receiving the PRS from a base station, and transmitting, to the location server, information for a measurement of the PRS. The configuration information includes information for an angle related to the PRS and the information for the angle related to the PRS includes i) a first value related to an expected angle and ii) a second value related to a range of the expected angle. A boundary value of the range of the expected angle is determined based on the first value and the second value.

19 Claims, 24 Drawing Sheets

(58) Field of Classification Search
CPC .............. H04B 7/06952; H04W 88/18; H04W 64/006; H04W 24/08; H04W 16/28; H04W 64/00; H04L 5/0051; H04L 5/0053; H04L 5/0048
USPC ..................................................... 455/456.5
See application file for complete search history.

(56) References Cited

U.S. PATENT DOCUMENTS

| | | | | |
|---|---|---|---|---|
| 2019/0037529 | A1* | 1/2019 | Edge | H04L 1/02 |
| 2020/0186265 | A1* | 6/2020 | Yun | H04B 17/27 |
| 2020/0259896 | A1* | 8/2020 | Sachs | H04L 67/12 |
| 2021/0333410 | A1* | 10/2021 | Gum | G01S 19/48 |
| 2022/0082653 | A1* | 3/2022 | Manolakos | G01S 13/003 |
| 2022/0150865 | A1* | 5/2022 | Cha | G01S 5/011 |
| 2022/0201774 | A1* | 6/2022 | Bao | H04W 72/56 |
| 2024/0012129 | A1* | 1/2024 | Duan | G01S 13/74 |
| 2024/0305354 | A1* | 9/2024 | Okamura | H04L 5/0051 |

FOREIGN PATENT DOCUMENTS

| | | | | |
|---|---|---|---|---|
| EP | 3739356 A1 | * | 11/2020 | ................ B60L 3/12 |
| JP | 2020112354 A | | 7/2020 | |
| KR | 10-2020-0032107 A | | 3/2020 | |
| WO | WO-2020204600 A2 | * | 10/2020 | ........... H04B 7/0408 |
| WO | WO-2022028032 A1 | * | 2/2022 | ............ G01S 5/0036 |
| WO | WO-2022055907 A1 | * | 3/2022 | ......... H04L 27/2613 |
| WO | WO-2022066380 A1 | * | 3/2022 | ............ G01S 5/0036 |
| WO | WO-2022081630 A1 | * | 4/2022 | ........... G01S 13/765 |
| WO | WO-2022082151 A1 | * | 4/2022 | ........... G01S 5/0273 |

OTHER PUBLICATIONS

Moderator (Intel Corporation), "Feature Lead Summary #2 for Enhancements of UL-AOA Positioning," 3GPP TSG RAN WG1 #104bis-e, R1-2103863, 30 pages, Apr. 2021.

Rapporteur (CATT), "Summary of RAN1 agreements for Rel-17 NR Positioning Enhancements", 3GPP TSG RAN WG1 Meeting #106bis-e, R1-2110667, e-Meeting, Oct. 11-19, 2021.

* cited by examiner (a)

(b)

X-Y plane with top view (a)

X-Z plane with side view (b)

METHOD OF TRANSMITTING AND RECEIVING INFORMATION FOR MEASUREMENT OF PRS IN WIRELESS COMMUNICATION SYSTEM AND APPARATUS THEREFOR

CROSS-REFERENCE TO RELATED APPLICATION

The present application claims the benefit of an earlier filing date and right of priority to Application No. U.S. 63/309,555 filed on Feb. 13, 2022 in United States, the contents of which are hereby incorporated by reference in its entirety.

BACKGROUND OF THE INVENTION

Field of the Invention

The present disclosure relates to a method of transmitting and receiving information for measurement of a PRS in a wireless communication system and an apparatus therefor.

Description of the Related Art

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

Meanwhile, in relation to positioning, a location server (e.g. Location Management Function, LMF) may transmit information for a search window (expected RSTD and uncertainty) to a base station (TRP)/a user equipment (UE) for efficient measurement of timing related positioning. However, this information (i.e. search window) cannot be helpful for angle-based measurement.

In relation to the angle-based measurement, the location server configures PRS resources in the UE. At this time, the location server delivers QCL information for the Rx beam to the UE. The UE receives the PRS through the indicated/configured Rx beam, but this may not be an optimal beam that perfectly reflects the location of the TRP.

In relation to the above problem, information related to the PRS may be configured in the UE in order to improve beam alignment between the UE/base station. Since a value of an angle related to the PRS may be interpreted differently by the UE and the base station, a specific method of interpretation/configuration of the angle related to the PRS is required.

For example, a value representing a beam direction related to the PRS may vary depending on whether an angle related to the beam direction is defined as a zenith angle or an elevation angle. That is, the zenith angle is measured in a vertical direction (e.g. 0 to 180), and the elevation angle is measured in a horizontal direction (e.g. −90 to +90).

As an example, when a value representing a range of the angle related to the PRS is configured, the beam alignment between the UE/base station related to PRS may be formed differently depending on whether the corresponding value is defined based on a value representing the starting point (or ending point) of the range or a value representing the midpoint of the range.

SUMMARY OF THE INVENTION

When the beams between the UE/base station are not aligned, the result of the position measurement may be inaccurate. Information related to the angle of the PRS may be defined/configured in order to improve the accuracy of angle-based position measurement.

An object of the present disclosure is to configure information (angle and range) related to the angle of the PRS without ambiguity in terms of the UE/base station operation.

Specifically, the present disclosure proposes a method for configuring the angle related to the PRS without ambiguity in terms of the UE/base station operation.

In addition, the present disclosure proposes a method for configuring the range of the angle related to the PRS without ambiguity in terms of the UE/base station operation.

The technical objects of the present disclosure are not limited to the aforementioned technical objects, and other technical objects, which are not mentioned above, will be apparently appreciated by a person having ordinary skill in the art from the following description.

A method for a user equipment to transmit information for measurement of a positioning reference signal (PRS) in a wireless communication system according to an embodiment of the present disclosure, the method comprises receiving, from a location server, configuration information related to the PRS, receiving the PRS from a base station, and transmitting, to the location server, information for a measurement of the PRS.

The configuration information includes information for an angle related to the PRS, and the information for the angle related to the PRS includes i) a first value related to an expected angle and ii) a second value related to a range of the expected angle.

A boundary value of the range of the expected angle is determined based on the first value and the second value.

A first boundary value of the range of the expected angle may be determined as a value obtained by subtracting ½ of the second value from the first value.

A second boundary value of the range of the expected angle may be determined as a value obtained by adding ½ of the second value to the first value.

The first value may include i) a value related to azimuth angle of arrival (AoA) and a value related to zenith angle of arrival (ZoA) or ii) a value related to azimuth angle of departure (AoD) and a value related to zenith angle of departure (ZoD).

The second value may include i) a value representing a range of the value related to the AoA and a value representing a range of the value related to the ZoA, or ii) a value representing a range of the value related to the AoD and a value representing a range of the value related to the ZoD.

The first value and the second value may be based on a global coordinate system (GCS) or a local coordinate system (LCS).

The first value and the second value may be configured in a predefined angular unit.

The information for the angle related to the PRS may be applied to a predefined positioning method. The predefined positioning method may include at least one of i) a downlink-angle of departure (DL-AoD)-based positioning method, ii) a downlink-time difference of arrival (DL-TDOA)-based positioning method and/or iii) a multi-round trip time (Multi-RTT)-based positioning method.

The configuration information related to the PRS may be received based on an LTE positioning protocol (LPP) message.

A user equipment (UE) transmitting information for measurement of a positioning reference signal (PRS) in a wireless communication system according to another embodiment of the present disclosure, the UE comprises one or more transceivers, one or more processors controlling the one or more transceivers, and one or more memories operably connected to the one or more processors.

The one or more memories store instructions for performing operations based on being executed by the one or more processors.

The operations comprise: receiving, from a location server, configuration information related to the PRS, receiving the PRS from a base station, and transmitting, to the location server, information for a measurement of the PRS.

The configuration information includes information for an angle related to the PRS, and the information for the angle related to the PRS includes i) a first value related to an expected angle and ii) a second value related to a range of the expected angle.

A boundary value of the range of the expected angle is determined based on the first value and the second value.

An apparatus controlling a user equipment (UE) to transmit information for measurement of a positioning reference signal (PRS) in a wireless communication system according to still another embodiment of the present disclosure, the apparatus comprises one or more processors, and one or more memories operably connected to the one or more processors.

The one or more memories store instructions for performing operations based on being executed by the one or more processors.

The operations comprise: receiving, from a location server, configuration information related to the PRS, receiving the PRS from a base station, and transmitting, to the location server, information for a measurement of the PRS.

The configuration information includes information for an angle related to the PRS, and the information for the angle related to the PRS includes i) a first value related to an expected angle and ii) a second value related to a range of the expected angle.

A boundary value of the range of the expected angle is determined based on the first value and the second value.

One or more non-transitory computer-readable medium according to still another embodiment of the present disclosure store one or more instructions.

The one or more instructions perform operations based on being executed by the one or more processors.

The operations comprise: receiving, from a location server, configuration information related to the PRS, receiving the PRS from a base station, and transmitting, to the location server, information for a measurement of the PRS.

The configuration information includes information for an angle related to the PRS, and the information for the angle related to the PRS includes i) a first value related to an expected angle and ii) a second value related to a range of the expected angle.

A boundary value of the range of the expected angle is determined based on the first value and the second value.

A method for a location server to receive information for measurement of a positioning reference signal (PRS) in a wireless communication system according to still another embodiment in the present disclosure, the method comprises transmitting, to a user equipment (UE), configuration information related to the PRS, and receiving, from the UE, information for a measurement of the PRS.

The configuration information includes information for an angle related to the PRS, and the information for the angle related to the PRS includes i) a first value related to an expected angle and ii) a second value related to a range of the expected angle.

A boundary value of the range of the expected angle is determined based on the first value and the second value.

A location server receiving information for measurement of a positioning reference signal (PRS) in a wireless communication system according to still another embodiment of the present disclosure, the location server comprises one or more transceivers, one or more processors controlling the one or more transceivers, and one or more memories operably connected to the one or more processors.

The one or more memories store instructions for performing operations based on being executed by the one or more processors.

The operations comprise: transmitting, to a user equipment (UE), configuration information related to the PRS, wherein the PRS is transmitted from a base station to the UE, and receiving, from the UE, information for a measurement of the PRS.

The configuration information includes information for an angle related to the PRS, and the information for the angle related to the PRS includes i) a first value related to an expected angle and ii) a second value related to a range of the expected angle.

A boundary value of the range of the expected angle is determined based on the first value and the second value.

According to the embodiment of the present disclosure, the information for the angle related to the PRS includes i) a first value related to an expected angle and ii) a second value related to a range of the expected angle. The boundary value of the range of the expected angle is determined based on the first value and the second value.

Accordingly, since the boundary value of the range of the expected angle is determined based on the first value and the second value, the ambiguity in the UE/base station beam alignment operation that occurs when the angle information related to the PRS is utilized can be removed.

According to the embodiment of the present disclosure, the first boundary value of the range of the expected angle can be determined as a value obtained by subtracting ½ of the second value from the first value. The second boundary value of the range of the expected angle can be determined as a value obtained by adding ½ of the second value to the first value.

Therefore, deterioration of the beam alignment level between the UE and the base station, which is caused by the range of the expected angle related to the PRS being interpreted/determined differently in terms of the UE and the location server (and/or the base station), respectively, can be prevented.

According to the embodiment of the present disclosure, the first value can include i) a value related to azimuth angle of arrival (AoA) and a value related to zenith angle of arrival (ZoA) or ii) a value related to azimuth angle of departure (AoD) and a value related to zenith angle of departure (ZoD). In addition, the second value can include i) a value representing a range of the value related to the AoA and a value representing a range of the value related to the ZoA, or ii) a value representing a range of the value related to the AoD and a value representing a range of the value related to the ZoD.

Therefore, deterioration of the beam alignment level between the UE and the base station, which is caused by the value for determining the expected angle related to the PRS and the range of the expected angle being interpreted/determined differently in terms of the UE and the location server (and/or the base station), respectively, can be prevented.

Also, according to the above embodiments, the effectiveness of signaling performed to improve the accuracy of the positioning method (i.e. signaling performed for configuration of the angle related to the PRS) can be guaranteed.

Effects which may be obtained by the present disclosure are not limited to the aforementioned effects, and other technical effects not described above may be evidently understood by a person having ordinary skill in the art to which the present disclosure pertains from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION OF THE EMBODIMENTS

Figure 1:
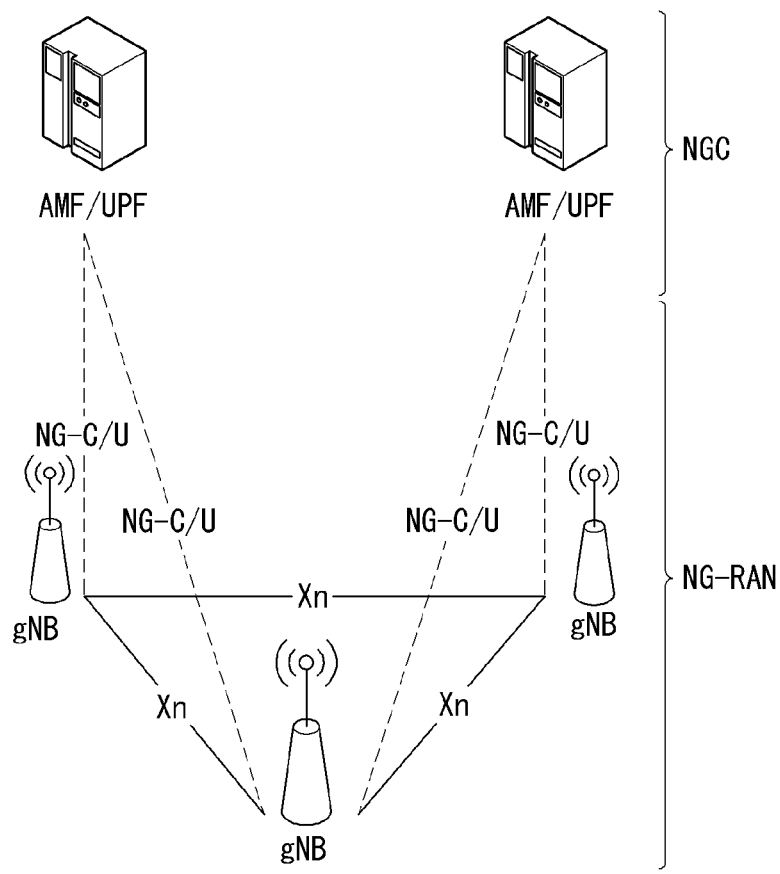
FIG. 1 is a diagram illustrating an example of an overall system structure of NR to which a method proposed in the present disclosure is applicable.

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ · 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max}N_f/100) \cdot T_s=10$ ms. Here, the radio frame is constituted of 10 subframes each of which has a period of $T_{sf}=(\Delta f_{max}N_f/1000) \cdot T_s=1$ ms. In this case, one set of frames for uplink and one set of frames for downlink may exist.

Figure 2:
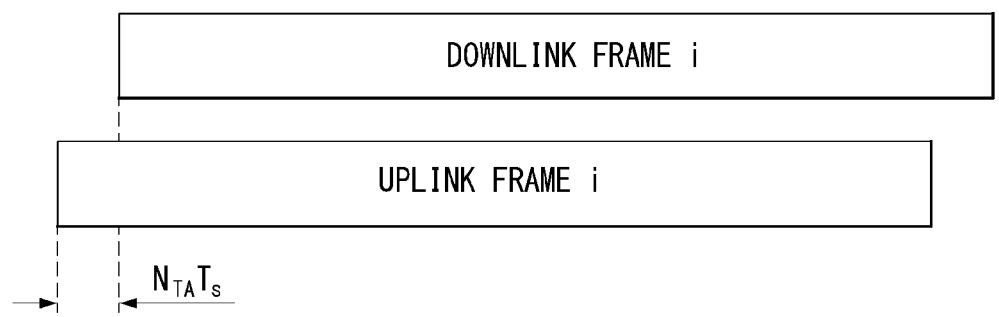
FIG. 2 illustrates a relationship between an uplink frame and a downlink frame in a wireless communication system to which a method proposed by the present disclosure is applicable.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^μ \in \{0, \ldots, N_{subframe}^{slots,μ}-1\}$ in the subframe and in ascending order of $n_{s,f}^μ \in \{0, \ldots, N_{frame}^{slots,μ}-1\}$ in the radio frame. One slot includes consecutive OFDM symbols of $N_{symb}^μ$, and $N_{symb}^μ$ is determined according to the used numerology and slot configuration. In the subframe, the start of slot $n_s^μ$ is temporally aligned with the start of $n_s^μ N_{symb}^μ$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,μ}$ of slots per radio frame, and the number $N_{slot}^{subframe,μ}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

Figure 3:
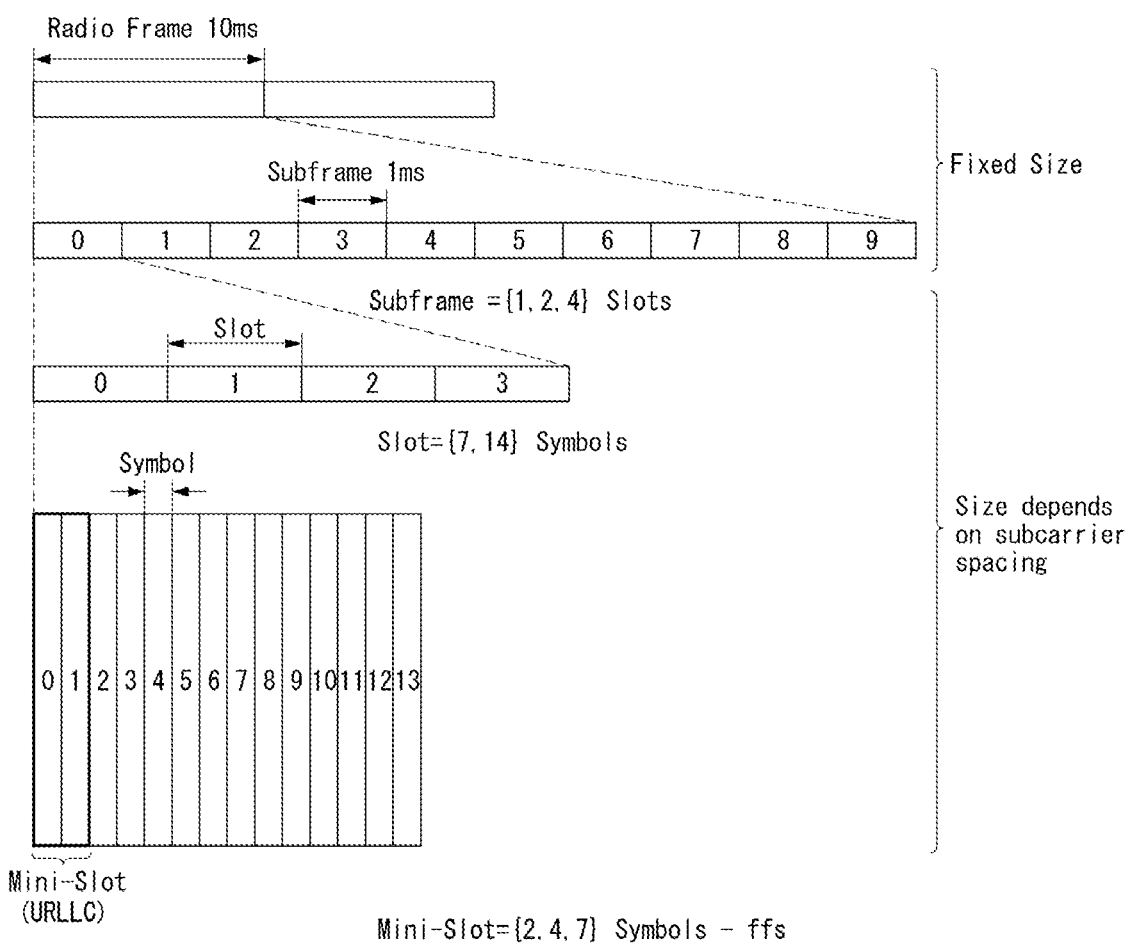
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
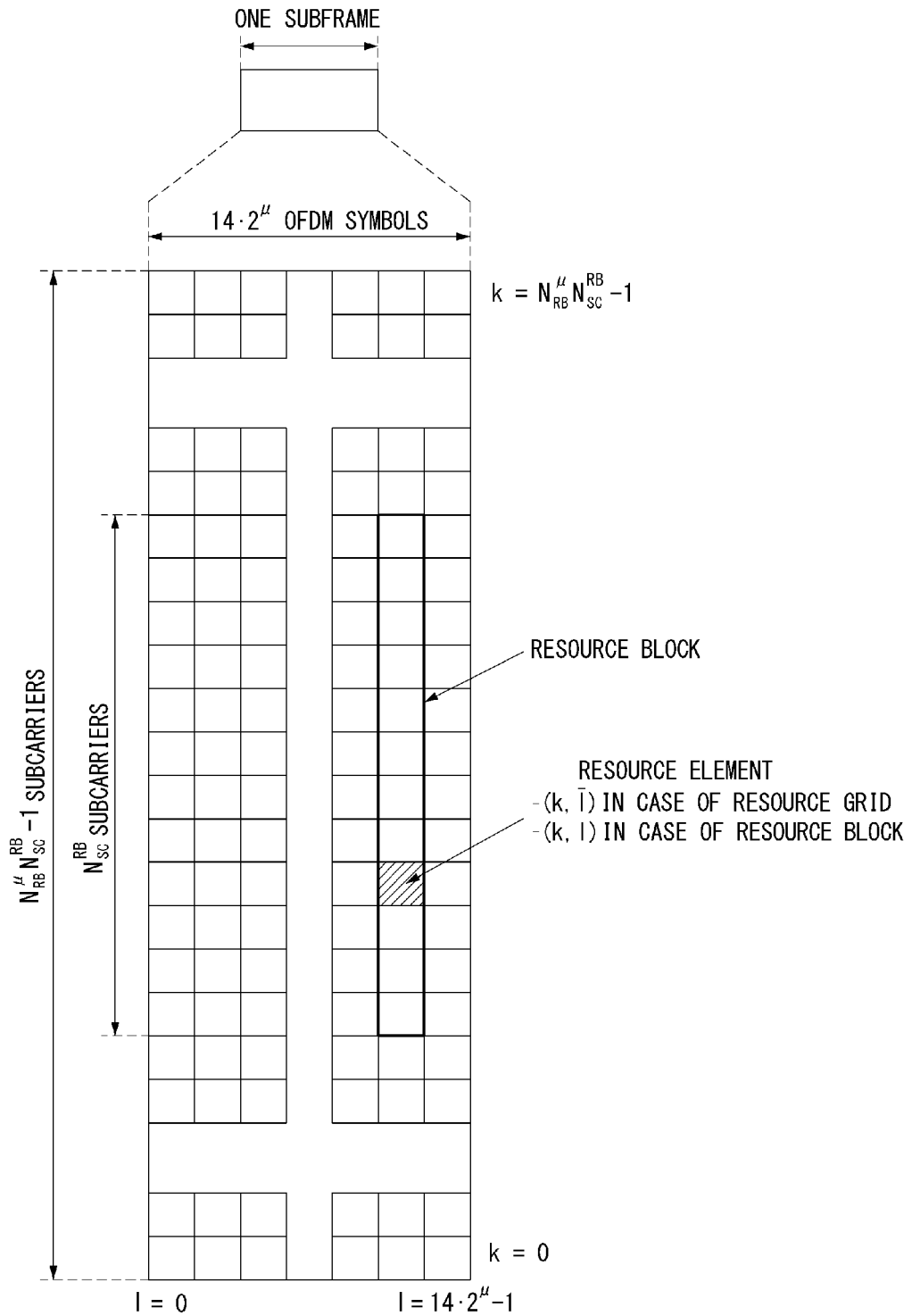
FIG. 4 illustrates an example of a resource grid supported by a wireless communication system to which a method proposed in the present disclosure is applicable.

FIG. 4 illustrates an example of a resource grid supported in a wireless communication system to which a method proposed in the present disclosure is applicable.

Referring to FIG. 4, a resource grid consists of $N_{RB}^μ N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^μ N_{sc}^{RB}$ subcarriers, and $2^μ N_{symb}^{(μ)}$ OFDM symbols, where $N_{RB}^μ \leq N_{RB}^{max,μ}$. $N_{RB}^{max,μ}$ denotes a maximum transmission bandwidth and may change not only between numerologies but also between uplink and downlink.

Figure 5:
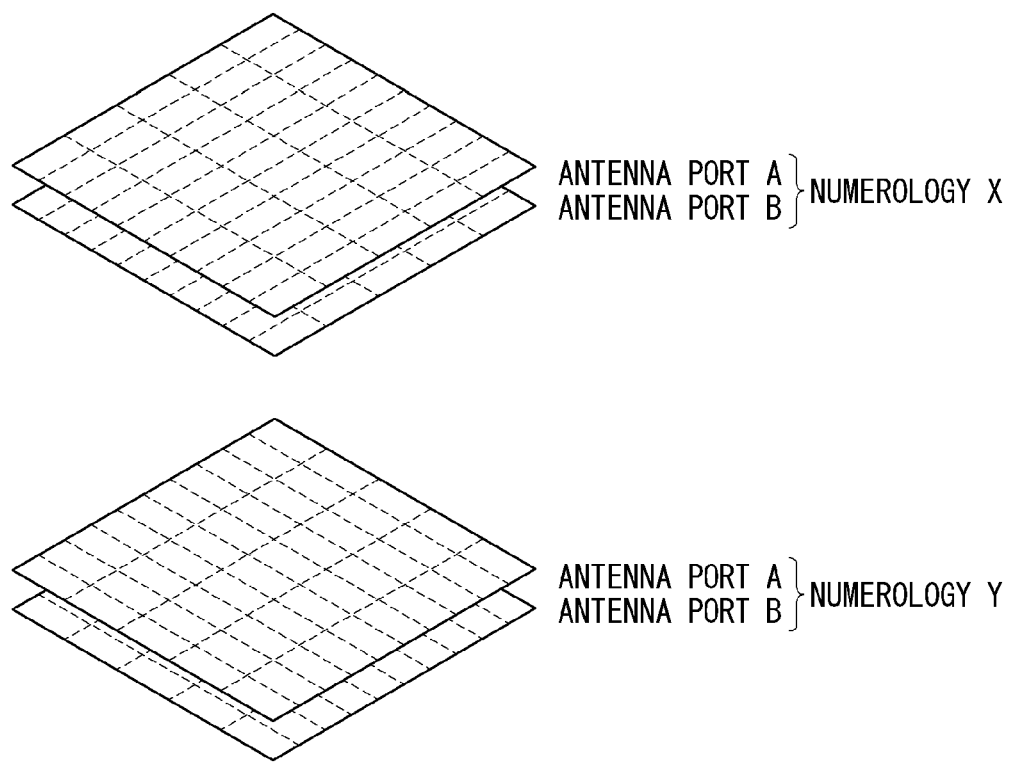
FIG. 5 illustrates examples of a resource grid for each antenna port and numerology to which a method proposed in the present disclosure is applicable.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, ..., $N_{RB}^{\mu}N_{sc}^{RB}-1$ is an index on a frequency domain, and l̄=0, ..., $2^{\mu}N_{symb}^{(\mu)}-1$ refers to a location of a symbol in a subframe. The index pair (k,l̄) is used to refer to a resource element in a slot, where l=0, ..., $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ a coincides with 'point A'. A common resource block number $n_{CRB}^{\mu}$ in the frequency domain and resource elements (k, l) for the subcarrier spacing configuration a may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

Figure 6:
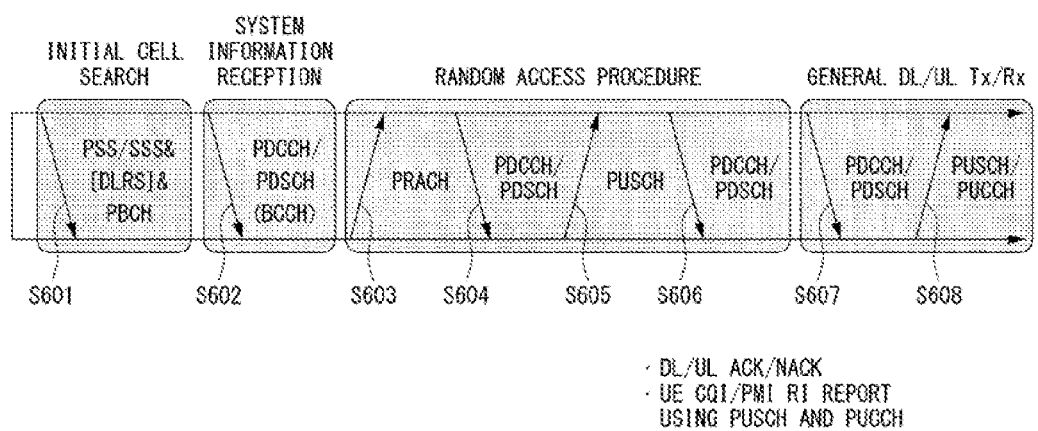
FIG. 6 illustrates physical channels and general signal transmission used in a 3GPP system.

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

Hereinafter, matters related to the definition of TRP mentioned in the present specification will be described in detail.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

Hereinafter, matters related to positioning in a wireless communication system will be described in detail.

Table 5 below shows definitions of terms used in relation to the positioning.

TABLE 5

Anchor carrier: In NB-IoT, a carrier where the UE assumes that NPSS/NSSS/NPBCH/SIB-NB are transmitted.
Location Server: a physical or logical entity (e.g., E-SMLC or SUPL SLP) that manages positioning for a target device by obtaining measurements and other location information from one or more positioning units and providing assistance data to positioning units to help determine this. A Location Server may also compute or verify the final location estimate.
E-SMLC: Evolved Serving Mobile Location Center
SLP: SUPL Location Platform
SUPL: Secure User Plane Location
NB-IoT: NB-IoT allows access to network services via E-UTRA with a channel bandwidth limited to 200 KHz.
Reference Source: a physical entity or part of a physical entity that provides signals (e.g., RF, acoustic, infra-red) that can be measured (e.g., by a Target Device) in order to obtain the location of a Target Device.
Target Device: the device that is being positioned (e.g., UE or SUPL SET).
Transmission Point (TP): A set of geographically co-located transmit antennas for one cell, part of one cell or one PRS-only TP. Transmission Points can include base station (ng-eNB or gNB) antennas, remote radio heads, a remote antenna of a base station, an antenna of a PRS-only TP, etc. One cell can be formed by one or multiple transmission points. For a homogeneous deployment, each transmission point may correspond to one cell.
Observed Time Difference Of Arrival (OTDOA): The time interval that is observed by a target device between the reception of downlink signals from two different TPs. If a signal from TP 1 is received at the moment $t_1$, and a signal from TP 2 is received at the moment $t_2$, the OTDOA is $t_2 - t_1$.
PRS-only TP: A TP which only transmits PRS signals for PRS-based TBS positioning and is not associated with a cell.
expected RSTD (from 36.355):

1) If PRS is transmitted:
This field indicates the RSTD value that the target device is expected to measure between this cell and the assistance data reference cell. The expectedRSTD field takes into account the expected propagation time TABLE 5-continued difference as well as transmit time difference of PRS positioning occasions between the two cells. The RSTD value can be negative and is calculated as (expectedRSTD-8192). The resolution is $3 \times T_s$, with $T_s = 1/(15000 \ast 2048)$ seconds.
2) If PRS is not transmitted:
This field indicates the RSTD value that the target device is expected to measure between this cell and the assistance data reference cell. The expectedRSTD field takes into account the expected propagation time difference as well as transmit time difference between the two cells. The RSTD value can be negative and is calculated as (expectedRSTD-8192). The resolution is $3 \times T_s$, with $T_s = 1/(15000 \ast 2048)$ seconds.
expectedRSTD-Uncertainty (from 36.355):

1) If PRS is transmitted:
This field indicates the uncertainty in expectedRSTD value. The uncertainty is related to the location server's a-priori estimation of the target device location. The expectedRSTD and expectedRSTD-Uncertainty together define the search window for the target device.
The scale factor of the expectedRSTD-Uncertainty field is $3 \times T_s$, with $T_s = 1/(15000 \ast 2048)$ seconds.
The target device may assume that the beginning of the PRS occasion group of the PRS configuration with the longest PRS occasion group periodicity (NOTE) of the neighbour cell is received within the search window of size [- expectedRSTD-Uncertainty$\times 3 \times T_s$, expectedRSTD-Uncertainty$\times 3 \times T_s$] centered at $T_{REF}$ + 1 millisecond$\times$N + (expectedRSTD−8192) $\times 3 \times T_s$, where $T_{REF}$ is the reception time of the beginning of the first PRS occasion group of the first PRS configuration of the assistance data reference cell at the target device antenna connector, N = 0 when the EARFCN of the neighbour cell is equal to that of the assistance data reference cell, and N = prs-SubframeOffset otherwise.
2) If PRS is not transmitted:
This field indicates the uncertainty in expectedRSTD value. The uncertainty is related to the location server's a-priori estimation of the target device location. The expectedRSTD and expectedRSTD-Uncertainty together define the search window for the target device. The scale factor of the expectedRSTD-Uncertainty field is $3 \times T_s$, with $T_s = 1/(15000 \ast 2048)$ seconds.
If $T_x$ is the reception time of the beginning of the subframe X of the assistance data reference cell at the target device antenna connector, the target device may assume that the beginning of the closest subframe of this neighbour cell to subframe X is received within the search window of size [-expectedRSTD-Uncertainty$\times 3 \times T_s$, expectedRSTD-Uncertainty$\times 3 \times T_s$] centered at $T_x$ + (expectedRSTD-8192) $\times 3 \times T_s$, The following shows definitions of abbreviations used in relation to the above positioning.

5GS: 5G System
AoA: Angle of Arrival
AP: Access Point
BDS: BeiDou Navigation Satellite System
BSSID: Basic Service Set Identifier
CID: Cell-ID (positioning method)
E-SMLC: Enhanced Serving Mobile Location Centre
E-CID: Enhanced Cell-ID (positioning method)
ECEF: Earth-Centered, Earth-Fixed
ECI: Earth-Centered-Inertial
EGNOS: European Geostationary Navigation Overlay Service
E-UTRAN: Evolved Universal Terrestrial Radio Access Network
GAGAN: GPS Aided Geo Augmented Navigation
GLONASS: GLObal'naya NAvigatsionnaya Sputnikovaya Sistema (Engl.: Global Navigation Satellite System)
GMLC: Gateway Mobile Location Center
GNSS: Global Navigation Satellite System
GPS: Global Positioning System
HESSID: Homogeneous Extended Service Set Identifier
LCS: LoCation Services
LMF: Location Management Function
LPP: LTE Positioning Protocol
MBS: Metropolitan Beacon System MO-LR: Mobile Originated Location Request
MT-LR: Mobile Terminated Location Request
NG-C: NG Control plane
NG-AP: NG Application Protocol
NI-LR: Network Induced Location Request
NRPPa: NR Positioning Protocol A
OTDOA: Observed Time Difference Of Arrival
PDU: Protocol Data Unit
PRS: Positioning Reference Signal
QZSS: Quasi-Zenith Satellite System
RRM: Radio Resource Management
RSSI: Received Signal Strength Indicator
RSTD: Reference Signal Time Difference/Relative Signal Time Difference
SBAS: Space Based Augmentation System
SET: SUPL Enabled Terminal
SLP: SUPL Location Platform
SSID: Service Set Identifier
SUPL: Secure User Plane Location
TADV: Timing Advance
TBS: Terrestrial Beacon System
TOA: Time of Arrival
TP: Transmission Point (TRP: Transmission and Reception Point)
UE: User Equipment
WAAS: Wide Area Augmentation System
WGS-84: World Geodetic System 1984
WLAN: Wireless Local Area Network Positioning Positioning may mean determining the geographic location and/or speed of the UE by measuring a radio signal. The location information may be requested by a client (e.g. an application) related to the UE and reported to the client. In addition, the location information may be included in a core network or may be requested by a client connected to the core network. The location information may be reported in a standard format such as cell-based or geographic coordinates, and in this case, the estimation error values for the location (position) and speed of the UE and/or the positioning measurement method used for positioning may be reported together.

Positioning Protocol Configuration

Figure 7:
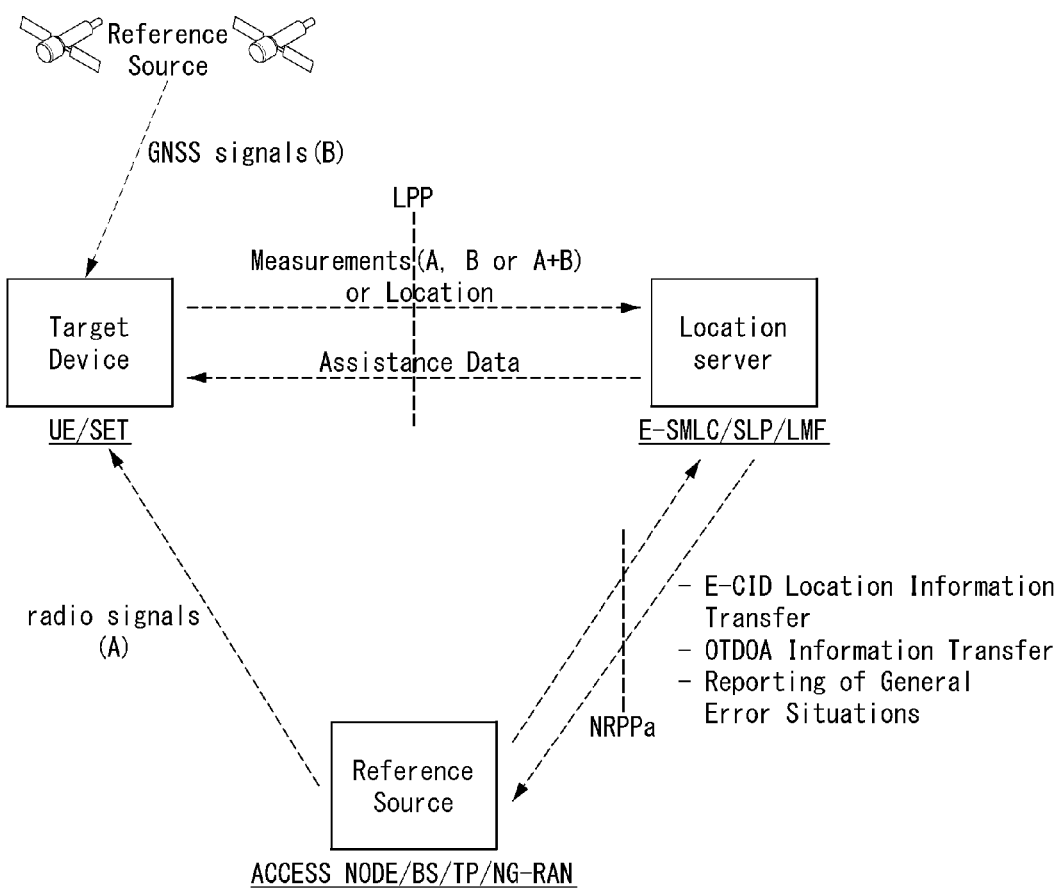
FIG. 7 is a diagram illustrating an example of a positioning protocol configuration for measuring a location of a user equipment (UE).

FIG. 7 is a diagram illustrating an example of a positioning protocol configuration for measuring a location of a user equipment (UE).

Referring to FIG. 7, LPP may be used as a point-to-point between a location server (E-SMLC and/or SLP and/or LMF) and a target device to position the target device (UE and/or SET) based on position-related measurements obtained from one or more reference sources. The target device and the location server may exchange measurement and/or location information based on signal A and/or signal B through the LPP.

NRPPa may be used to exchange information between the reference source (ACCESS NODE and/or BS and/or TP and/or NG-RAN nodes) and the location server.

Functions provided by the NRPPa protocol may include the following.

E-CID Location Information Transfer: Through this function, location information may be exchanged between the reference source and the LMF for E-CID positioning purposes.

OTDOA Information Transfer: Through this function, information may be exchanged between the reference source and the LMF for OTDOA positioning purposes.

Reporting of General Error Situations: Through this function, a general error situation in which an error message for each function is not defined may be reported.

PRS Mapping

For positioning, a positioning reference signal (PRS) may be used. The PRS is a reference signal used for position estimation of the UE.

PRS mapping in a wireless communication system to which embodiments are applicable in the present disclosure may be performed based on Table 6 below.

TABLE 6

7.2 Physical resources
The following antenna ports are defined for the downlink:
- Antenna ports starting with 5000 for positioning reference signals
The UE shall not assume that two antenna ports are quasi co-located with respect to any QCL type unless specified otherwise.
7.4.1.7 Positioning reference signals
7.4.1.7.1  General
A positioning frequency layer consists of one or more downlink PRS resource sets, each of which consists of one or more downlink PRS resources as described in [6, TS 38.214].
7.4.1.7.2  Sequence generation
The UE shall assume the reference-signal sequence r(m) is defined by $$r(m) = \frac{1}{\sqrt{2}}(1 - 2c(m)) + j\frac{1}{\sqrt{2}}(1 - 2c(m+1))$$

where the pseudo-random sequence c(i) is defined in clause 5.2.1. The pseudo-random sequence generator shall be initialised with $$c_{init} = \left(2^{22}\left\lfloor\frac{n_{ID,seq}^{PRS}}{1024}\right\rfloor + 2^{10}\left(N_{symb}^{slot}n_{s,f}^{\mu} + 1 + 1\right)\left(2\left(n_{ID,seq}^{PRS}\bmod 1024\right) + 1\right) + \left(n_{ID,seq}^{PRDS}\bmod 1024\right)\right)\bmod 2^{31}$$

where $n_{s,f}^{\mu}$ is the slot number, the downlink PRS sequence ID $n_{ID,seq}^{PRS} \in \{0, 1, \ldots, 4095\}$ is given by the higher-layer parameter DL-PRS-SequenceId, and l is the OFDM symbol within the slot to which the sequence is mapped.
7.4.1.7.3  Mapping to physical resources in a downlink PRS resource
For each downlink PRS resource configured, the UE shall assume the sequence r(m) is scaled with a factor $\beta_{PRS}$ and mapped to resources elements $(k, l)_{p,\mu}$ according to
    $a_{k,l}^{(p,\mu)} = \beta_{PRS}\, r(m)$
    $m = 0, 1, \ldots$
    $k = mK_{comb}^{PRS} + ((k_{offset}^{PRS} + k') \bmod K_{comb}^{PRS})$
    $l = l_{start}^{PRS}, l_{start}^{PRS} + 1, \ldots, l_{start}^{PRS} + L_{PRS} - 1$

TABLE 6-continued when the following conditions are fulfilled:
- the resource element $(k, l)_{p,\mu}$ is within the resource blocks occupied by the downlink
PRS resource for which the UE is configured;
- the symbol l is not used by any SS/PBCH block used by the serving cell for downlink
PRS transmitted from the serving cell or indicated by the higher-layer parameter
SSB-positionInBurst for downlink PRS transmitted from a non-serving cell;
- the slot number satisfies the conditions in clause 7.4.1.7.4. [TS 38.211]
and where
- $l_{start}^{PRS}$ is the first symbol of the downlink PRS within a slot and given by the higher-layer
parameter DL-PRS-ResourceSymbolOffset;
- the size of the downlink PRS resource in the time domain $L_{PRS} \in \{2, 4, 6, 12\}$ is given by
the higher-layer parameter DL-PRS-NumSymbols;
- the comb size $K_{comb}^{PRS} \in \{2, 4, 6, 12\}$ is given by the higher-layer parameter
transmissionComb;
- the resource-element offset $k_{offset}^{PRS} \in \{0, 1, \ldots, K_{comb}^{PRS} - 1\}$ is given by the higher-layer
parameter combOffset;
- the quantity k' is given by Table 7.4.1.7.3-1.
The reference point for k = 0 is the location of the point A of the positioning frequency layer, in
which the downlink PRS resource is configured where point A is given by the higher-layer
parameter DL-PRS-PointA.

Table 7.4.1.7.3-1: The frequency offset k' as a function of $l - l_{start}^{PRS}$.

| | Symbol number within the downlink PRS resource $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

7.4.1.7.4    Mapping to slots in a downlink PRS resource set
For a downlink PRS resource in a downlink PRS resource set, the UE shall assume the downlink
PRS resource being transmitted when the slot and frame numbers fulfill $$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \left\{iT_{gap}^{PRS}\right\}_{i=0}^{T_{rep}^{PRS}-1}$$

and one of the following conditions are fulfilled:
- the higher-layer parameter DL-PRS-MutingPattern is not provided;
- the higher-layer parameter DL-PRS-MutingPattern is provided and bitmap $\{b^1\}$ but not
bitmap $\{b^2\}$ is provided, and bit $b_i^1$ is set;
- the higher-layer parameter DL-PRS-MutingPattern is provided and bitmap $\{b^2\}$ but not
bitmap $\{b^1\}$ is provided, and bit $b_i^2$ is set;
- the higher-layer parameter DL-PRS-MutingPattern is provided and both bitmaps $\{b^1\}$
and $\{b^2\}$ are provided, and both bit $b_i^1$ and $b_i^2$ are set.
where
- $b_i^1$ is bit $i = \lfloor(N_{slot}^{frame,\mu} n_f + n_{s,f}^{\mu} - T_{offset}^{PRS} - T_{offset,res}^{PRS})/(2^{\mu}T_{muting}^{PRS}T_{per}^{PRS})\rfloor \bmod L$ in the bitmap
given by the higher-layer parameter DL-PRS-MutingPattern where $L \in \{2, 4, 8, 16, 32\}$ is the size
of the bitmap;
- $b_i^2$ is bit $i = \lfloor((N_{slot}^{frame,\mu} n_f + n_{s,f}^{\mu} - T_{offset}^{PRS} - T_{offset,res}^{PRS}) \bmod 2^{\mu}T_{per}^{PRS})/T_{gap}^{PRS}\rfloor \bmod T_{rep}^{PRS}$ in
the bitmap given by the higher-layer parameter DL-PRS-MutingPattern;
- the slot offset $T_{offset}^{PRS} \in \{0, 1, \ldots, T_{per}^{PRS} - 1\}$ is given by the higher-layer parameter
DL-PRS-ResourceSetSlotOffset;
- the downlink PRS resource slot offset $T_{offset,res}^{PRS}$ is given by the higher-layer parameter
DL-PRS- ResourceSlotOffset;
- the periodicity $T_{per}^{PRS} \in$
$\{4, 5, 8, 10, 16, 20, 32, 40, 64, 80, 160, 320, 640, 1280, 2560, 5120, 10240\}$ is given by the
higher-layer parameter DL-PRS-Periodicity;
- the repetition factor $T_{rep}^{PRS} \in \{1, 2, 4, 6, 8, 16, 32\}$ is given by the higher-layer parameter
DL-PRS-ResourceRepetitionFactor;
- the muting repetition factor $T_{muting}^{PRS}$ is given by the higher-layer parameter
DL-PRS-MutingBitRepetitionFactor;
- the time gap $T_{gap}^{PRS} \in \{1, 2, 4, 8, 16, 32\}$ is given by the higher-layer parameter
DL-PRS-ResourceTimeGap;
For a downlink PRS resource in a downlink PRS resource set configured, the UE shall assume
the downlink PRS resource being transmitted as described in clause 5.1.6.4 of [6, TS 38.214].

PRS Reception Procedure

The PRS reception procedure of the UE in a wireless communication system to which embodiments are applicable in the present disclosure may be performed based on Table 7 below.

TABLE 7

5.1.6.5 PRS reception procedure
The UE can be configured with one or more DL PRS resource set configuration(s) as indicated by the higher layer parameters DL-PRS-ResourceSet and DL-PRS-Resource. Each DL PRS resource set consists of K≥1 DL PRS resource(s) where each has an associated spatial transmission filter. The UE can be configured with one or more DL PRS Positioning Frequency Layer configuration(s) as indicated by the higher layer parameter DL-PRS-PositioningFrequencyLayer. A DL PRS Positioning Frequency Layer is defined as a collection of DL PRS Resource Sets which have common parameters configured by DL-PRS-PositioningFrequencyLayer.
The UE assumes that the following parameters for each DL PRS resource(s) are configured via higher layer parameters DL-PRS-PositioningFrequencyLayer, DL-PRS-ResourceSet and DL-PRS-Resource.
A positioning frequency layer consists of one or more PRS resource sets and it is defined by:
    DL-PRS-SubcarrierSpacing defines the subcarrier spacing for the DL PRS resource. All DL PRS Resources and DL PRS Resource sets in the same DL-PRS-PositioningFrequencyLayer have the same value of DL-PRS-SubcarrierSpacing. The supported values of DL-PRS-SubcarrierSpacing are given in Table 4.2-1 of [4, TS38.211].
    DL-PRS-CyclicPrefix defines the cyclic prefix for the DL PRS resource. All DL PRS Resources and DL PRS Resource sets in the same DL-PRS-PositioningFrequencyLayer have the same value of DL-PRS-CyclicPrefix. The supported values of DL-PRS-CyclicPrefix are given in Table 4.2-1 of [4, TS38.211].
    DL-PRS-PointA defines the absolute frequency of the reference resource block. Its lowest subcarrier is also known as Point A. All DL PRS resources belonging to the same DL PRS Resource Set have common Point A and all DL PRS Resources sets belonging to the same DL-PRS-PositioningFrequencyLayer have a common Point A.
The UE expects that it will be configured with [IDs] each of which is defined such that it is associated with multiple DL PRS Resource Sets from the same cell. The UE expects that one of these [IDs] along with a DL-PRS-ResourceSetId and a DL-PRS-ResourceId can be used to uniquely identify a DL PRS Resource.
A PRS resource set consists of one or more PRS resources and it is defined by:
    DL-PRS-ResourceSetId defines the identity of the DL PRS resource set configuration.
    DL-PRS-Periodicity defines the DL PRS resource periodicity and takes values $T_{per}^{PRS} \in 2^{\mu}\{4, 8, 16, 32, 64, 5, 10, 20, 40, 80, 160, 320, 640, 1280, 2560, 5120, 10240, 20480\}$ slots, where $\mu = 0, 1, 2, 3$ for DL-PRS-SubcarrierSpacing=15, 30, 60 and 120kHz respectively. $T_{per}^{PRS} = 2^{\mu} \cdot 20480$ is not supported for $\mu = 0$. All the DL PRS resources within one resource set are configured with the same periodicity.
    DL-PRS-ResourceRepetitionFactor defines how many times each DL-PRS resource is repeated for a single instance of the DL-PRS resource set and takes values $T_{rep}^{PRS} \in \{1,2,4,6,8,16,32\}$ ,. All the DL PRS resources within one resource set have the same Resource RepetitionFactor
    DL-PRS-ResourceTimeGap defines the offset in number of slots between two repeated instances of a DL PRS resource with the same DL-PRS-ResourceID within a single instance of the DL PRS resource set and takes values $T_{gap}^{PRS} \in \{1,2,4,8,16,32\}$. The UE only expects to be configured with DL-PRS-ResourceTimeGap if DL-PRS-ResourceRepetitionFactor is configured with value greater than 1. The time duration spanned by one instance of a DL-PRS-ResourceSet is not expected to exceed the configured value of DL-PRS-Periodicity. All the DL PRS resources within one resource set have the same DL-PRS-ResourceTimeGap.
    DL-PRS-MutingPattern defines a bitmap of the time locations where the DL PRS resource is expected to not be transmitted for a DL PRS resource set. The bitmap size can be {2, 4, 8, 16, 32} bits long. The bitmap has two options for applicability. In the first option each bit in the bitmap corresponds to a configurable number of consecutive instances of a DL-PRS-ResourceSet where all the DL-PRS-Resources within the set are muted for the instance that is indicated to be muted. In the second option each bit in the bitmap corresponds to a single repetition index for each of the DL-PRS-Resources within each instance of a DL-PRS-ResourceSet and the length of the bitmap is equal to DL-PRS-ResourceRepetitionFactor. Both options may be configured at the same time in which case the logical AND operation is applied to the bit maps as described in clause 7.4.1.7.4 of [4, TS 38.211].
    DL-PRS-SFN0-Offset defines the time offset of the SFN0 slot 0 for the transmitting cell with respect to SFN0 slot 0 of [FFS in RAN2].
    DL-PRS-ResourceSetSlotOffset defines the slot offset with respect to SFN0 slot 0 and takes values $T_{offset}^{PRS} \in \{0,1, \ldots, T_{per}^{PRS} - 1\}$.
    DL-PRS-CombSizeN defines the comb size of a DL PRS resource where the allowable values are given in Clause 7.4.1.7.1 of [TS38.211]. All DL PRS resource sets belonging to the same positioning frequency layer have the same value of DL-PRS-combSizeN.
    DL-PRS-ResourceBandwidth defines the number of resource blocks configured for PRS transmission. The parameter has a granularity of 4 PRBs with a minimum of 24 PRBs and a maximum of 272 PRBs. All DL PRS resources sets within a positioning frequency layer have the same value of DL-PRS-ResourceBandwidth.

TABLE 7-continued

A PRS resource is defined by:
  DL-PRS-ResourceList determines the DL PRS resources that are contained within one
DL PRS resource set.
  DL-PRS-ResourceId determines the DL PRS resource configuration identity. All DL PRS
resource IDs are locally defined within a DL PRS resource set.
  DL-PRS-SequenceId is used to initialize cinit value used in pseudo random generator [4,
TS38.211, 7.4.1.7.2] for generation of DL PRS sequence for a given DL PRS resource.
  DL-PRS-ReOffset defines the starting RE offset of the first symbol within a DL PRS
resource in frequency. The relative RE offsets of the remaining symbols within a DL PRS
resource are defined based on the initial offset and the rule described in Clause 7.4.1.7.3 of [4,
TS38.211].
  DL-PRS-ResourceSlotOffset determines the starting slot of the DL PRS resource with
respect to corresponding DL-PRS-ResourceSetSlotOffset
  DL-PRS-ResourceSymbolOffset determines the starting symbol of the DL PRS resource
within the starting slot.
  DL-PRS-NumSymbols defines the number of symbols of the DL PRS resource within a
slot where the allowable values are given in Clause 7.4.1.7.1 of [4, TS38.211].
  DL-PRS-QCL-Info defines any quasi-colocation information of the DL PRS resource with
other reference signals. The DL PRS may be configured to be 'QCL-Type-D' with a DL PRS or
SS/PBCH Block from a serving cell or a non-serving cell. The DL PRS may be configured to be
'QCL-Type-C' with a SS/PBCH Block from a serving or non-serving cell. If the DL PRS is
configured as both 'QCL-Type-C' and 'QCL-Type-D' with a SS/PBCH Block then the SSB index
indicated should be the same.
  DL-PRS-StartPRB defines the starting PRB index of the DL PRS resource with respect
to reference Point A. The starting PRB index has a granularity of one PRB with a minimum value
of 0 and a maximum value of 2176 PRBs. All DL PRS Resource Sets belonging to the same
Positioning Frequency Layer have the same value of Start PRB.
The UE assumes constant EPRE is used for all REs of a given DL PRS resource.
The UE may be indicated by the network that a DL PRS resources can be used as the reference
for the RSTD measurement in a higher layer parameter DL-PRS-RstdReferenceInfo. The
reference time indicated by the network to the UE can also be used by the UE to determine how
to apply higher layer parameters DL-PRS-expectedRSTD and
DL-PRS-expectedRSTD-uncertainty. The UE expects the reference time to be indicated
whenever it is expected to receive the DL PRS. This reference time provided by
DL-PRS-RstdReferenceInfo may include an [ID], a PRS resource set ID, and optionally a single
PRS resource ID or a list of PRS resource IDs. The UE may use different DL PRS resources or a
different DL PRS resource set to determine the reference time for the RSTD measurement as
long as the condition that the DL PRS resources used belong to a single DL PRS resource set is
met. If the UE chooses to use a different reference time than indicated by the network, then it is
expected to report the DL PRS resource ID(s) or the DL PRS resource set ID used to determine
the reference.
The UE may be configured to report quality metrics corresponding to the RSTD and UE Rx-Tx
time difference measurements which include the following fields:
  TimingMeasQuality-Value which provides the best estimate of the uncertainty of the
measurement
  TimingMeasQuality-Resolution which specifies the resolution levels used in the Value
field
The UE expects to be configured with higher layer parameter DL-PRS-expectedRSTD, which
defines the time difference with respect to the received DL subframe timing the UE is expected to
receive DL PRS, and DL-PRS-expectedRSTD-uncertainty, which defines a search window
around the expectedRSTD.
For DL UE positioning measurement reporting in higher layer parameters
DL-PRS-RstdMeasurementInfo or DL-PRS-UE-Rx-Tx-MeasurementInfo the UE can be
configured to report the DL PRS resource ID(s) or the DL PRS resource set ID(s) associated with
the DL PRS resource(s) or the DL PRS resource set(s) which are used in determining the UE
measurements DL RSTD, UE Tx-Rx time difference or the DL PRS-RSRP.
The UE can be configured in higher layer parameter UE Rx-Tx Time-MeasRequestInfo to report
multiple UE Rx-Tx time difference measurements corresponding to a single configured SRS
resource or resource set for positioning. Each measurement corresponds to a single received DL
PRS resource or resource set which can be in difference positioning frequency layers.
For the DL RSTD, DL PRS-RSRP, and UE Rx-Tx time difference measurements the UE can
report an associated higher layer parameter Timestamp. The Timestamp can include the SFN
and the slot number for a subcarrier spacing. These values correspond to the reference which is
provided by DL-PRS-RSTDReferenceInfo.
The UE is expected to measure the DL PRS resource outside the active DL BWP or with a
numerology different from the numerology of the active DL BWP if the measurement is made
during a configured measurement gap. When not configured with a measurement gap, the UE is
only required to measure DL PRS within the active DL BWP and with the same numerology as
the active DL BWP. If the UE is not provided with a measurement gap, the UE is not expected to
process DL PRS resources on serving or non-serving cells on any symbols indicated as UL by
the serving cell. When the UE is expected to measure the DL PRS resource outside the active
DL BWP it may request a measurement gap in higher layer parameter [XYZ].
The UE assumes that for the serving cell the DL PRS is not mapped to any symbol that contains
SS/PBCH. If the time frequency location of the SS/PBCH block transmissions from non-serving
cells are provided to the UE then the UE also assumes that the DL PRS is not mapped to any
symbol that contains the SS/PBCH block of the non-serving cell.

TABLE 7-continued

The UE may be configured to report, subject to UE capability, up to 4 DL RSTD measurements per pair of cells with each measurement between a different pair of DL PRS resources or DL PRS resource sets within the DL PRS configured for those cells. The up to 4 measurements being performed on the same pair of cells and all DL RSTD measurements in the same report use a single reference timing.
The UE may be configured to measure and report up to 8 DL PRS RSRP measurements on different DL PRS resources from the same cell. When the UE reports DL PRS RSRP measurements from one DL PRS resource set, the UE may indicate which DL PRS RSRP measurements have been performed using the same spatial domain filter for reception.
If the UE is configured with DL-PRS-QCL-Info and the QCL relation is between two DL PRS resources, then the UE assumes those DL PRS resources are from the same cell. If DL-PRS-QCL-Info is configured to the UE with 'QCL-Type-D' with a source DL-PRS-Resource then the DL-PRS-ResourceSetId and the DL-PRS-ResourceId of the source DL-PRS-Resource are expected to be indicated to the UE.
The UE does not expect to process the DL PRS in the same symbol where other DL signals and channels are transmitted to the UE when there is no measurement gap configured to the UE.

Positioning Architecture

Figure 8:
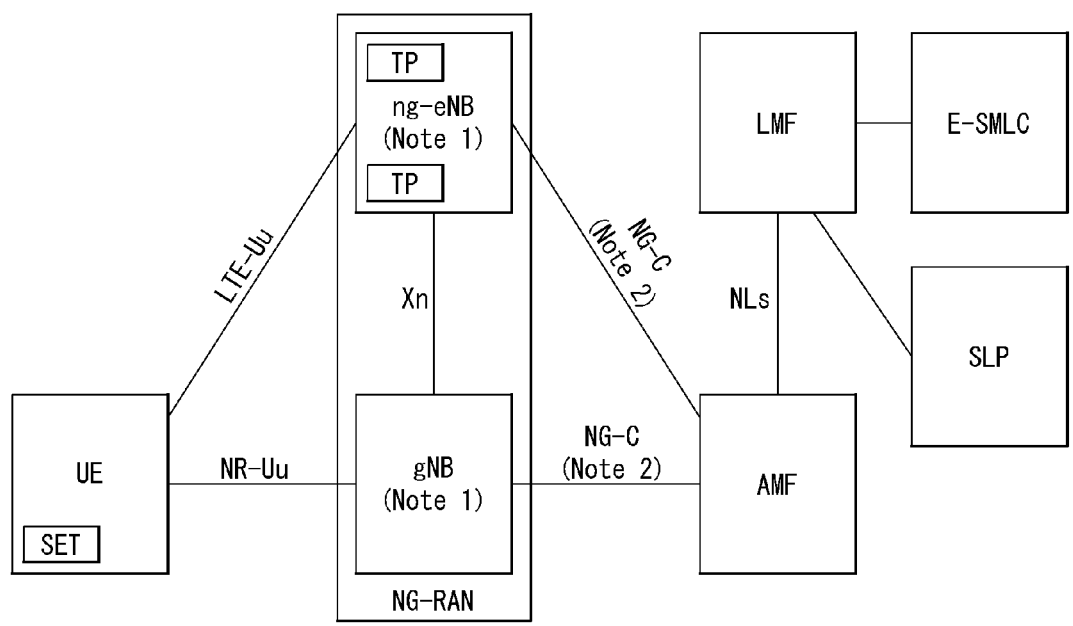
FIG. 8 is a diagram illustrating an example of architecture of a system for measuring a location of an UE.

FIG. 8 is a diagram illustrating an example of architecture of a system for measuring a location of an UE.

Referring to FIG. 8, the AMF (Core Access and Mobility Management Function) may receive a request for location service related to a specific target UE from another entity such as the GMLC (Gateway Mobile Location Center), or may decide to start the location service on behalf of the specific target UE in the AMF itself. Then, the AMF transmits a location service request to the LMF (Location Management Function). The LMF receiving the location service request may process the location service request and return a processing result including the estimated location of the UE to the AMF. On the other hand, based on the location service request being received from another entity such as the GMLC other than the AMF, the AMF may transmit the processing result received from the LMF to another entity.

New generation evolved-NB (ng-eNB) and gNB may be network elements of NG-RAN that can provide measurement results for location tracking, and measure a radio signal for the target UE and transmit the result to the LMF. In addition, the ng-eNB may control some TPs (Transmission Points), such as remote radio heads, or PRS-only TPs supporting a PRS-based beacon system for E-UTRA.

The LMF may be connected to an Enhanced Serving Mobile Location Center (E-SMLC), and the E-SMLC may enable the LMF to access the E-UTRAN. For example, the E-SMLC may enable the LMF to support Observed Time Difference Of Arrival (OTDOA) which is one of the E-UTRAN positioning measurement methods, based on the downlink measurement which is obtained by the target UE through a signal transmitted from TPs dedicated for PRS in the eNB and/or E-UTRAN.

Meanwhile, the LMF may be connected to a SUPL Location Platform (SLP). The LMF may support and manage different location services for target UEs. The LMF may interact with the serving ng-eNB or serving gNB for the target UE to obtain the location measurement of the UE. For positioning of the target UE, the LMF may determine a positioning measurement method based on Location Service (LCS) client type, required QoS (Quality of Service), UE positioning capabilities, and gNB positioning capabilities and ng-eNB positioning capabilities, and apply this positioning measurement method to the serving gNB and/or the serving ng-eNB. Then, the LMF may determine a position estimate for the target UE and additional information such as accuracy of the position estimate and velocity. The SLP is a SUPL (Secure User Plane Location) entity responsible for positioning through a user plane.

The UE may measure the location of the UE by utilizing a downlink reference signal transmitted from the NG-RAN and the E-UTRAN. In this case, the downlink reference signal transmitted from the NG-RAN and the E-UTRAN to the UE may include an SS/PBCH block, CSI-RS and/or PRS, etc., and whether to measure the location of the UE using any downlink reference signal may depend on a configuration such as LMF/E-SMLC/ng-eNB/E-UTRAN, etc. In addition, the location of the UE may be measured in a RAT-independent method using different GNSS (Global Navigation Satellite System), TBS (Terrestrial Beacon System), WLAN access points, Bluetooth beacon and a sensor (e.g. barometric pressure sensor) built into the UE. The UE may include an LCS application, and access the LCS application through communication with a network to which the UE is connected or other applications included in the UE. The LCS application may include measurement and calculation functions necessary to determine the location of the UE. For example, the UE may include an independent positioning function such as Global Positioning System (GPS), and may report the location of the UE independently of NG-RAN transmission. The independently acquired positioning information may be utilized as auxiliary information of positioning information acquired from the network.

Position Measurement Procedure

Figure 9:
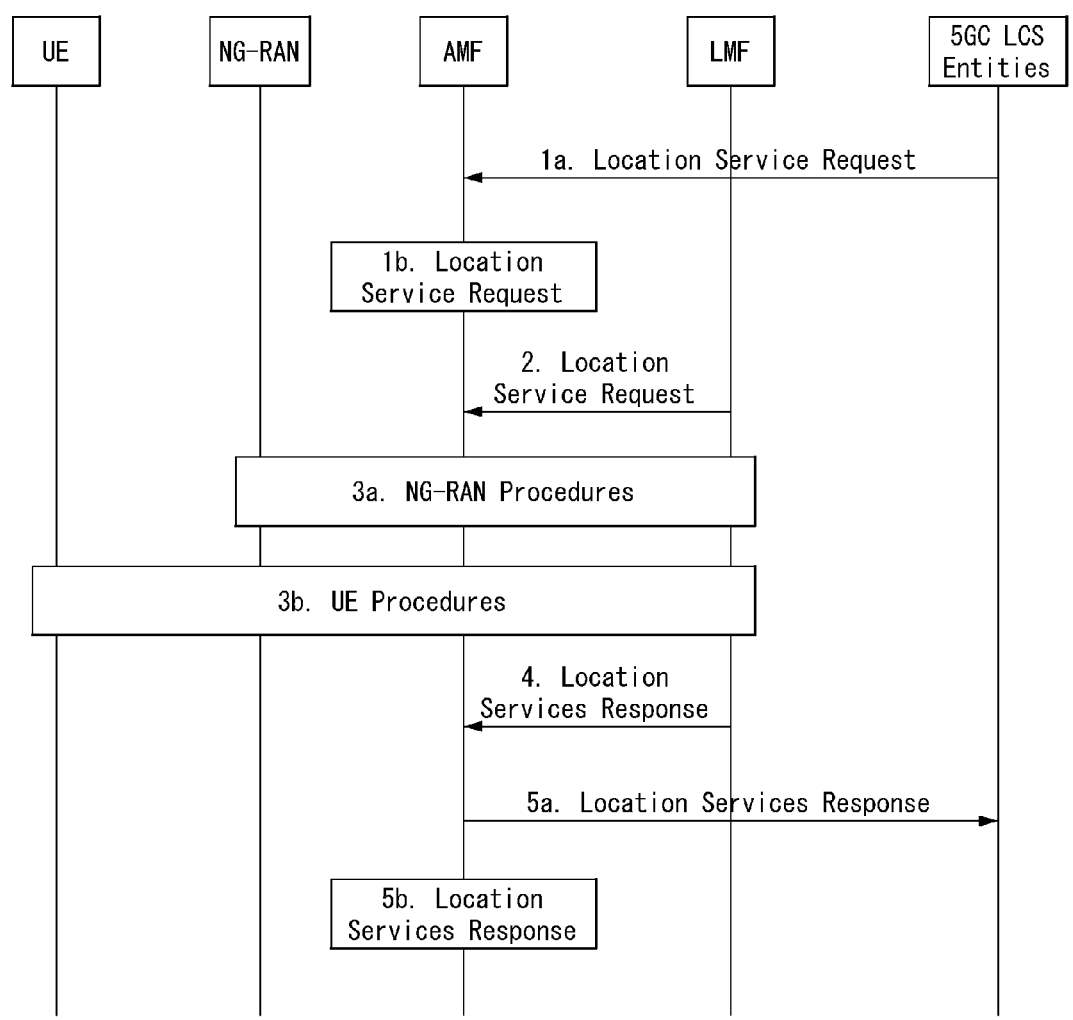
FIG. 9 is a diagram illustrating an example of a procedure for measuring a location of a UE.

FIG. 9 is a diagram illustrating an example of a procedure for measuring a location of a UE.

When the UE is in CM-IDLE (Connection Management—IDLE) state, when the AMF receives a location service request, the AMF may establish a signaling connection with the UE, and request a network trigger service to allocate a specific serving gNB or ng-eNB. This operation process is omitted in FIG. 9. That is, in FIG. 8, it may be assumed that the UE is in a connected mode. However, the signaling connection may be released during the positioning process by the NG-RAN for reasons such as signaling and data inactivity.

Looking at the operation process of the network for measuring the location of the UE in detail with reference to FIGS. 8 and 9, in step 1a, a 5GC entity such as GMLC may request a location service for measuring the location of a target UE with a serving AMF. However, even if the GMLC does not request the location service, based on step 1b, the serving AMF may determine that the location service is necessary for measuring the location of the target UE. For example, in order to measure the location of the UE for an emergency call, the serving AMF may decide to directly perform the location service.

Then, based on step 2, the AMF may send a location service request to the LMF, and based on step 3a, the LMF may initiate location procedures for obtaining location measurement data or location measurement assistance data together with the serving ng-eNB and the serving gNB. For example, the LMF may request location-related information related to one or more UEs to the NG-RAN, and instruct the type of location information required and the associated QoS. Then, in response to the request, the NG-RAN may transmit the location-related information to the LMF. In this case, based on the method for determining the location by the request being E-CID, the NG-RAN may transmit additional location-related information to the LMF through one or more NRPPa messages. Here, 'location-related information' may mean all values used for location calculation, such as actual location estimation information and wireless measurement or location measurement, etc. In addition, the protocol used in step 3a may be an NRPPa protocol, which will be described later.

Additionally, based on step 3b, the LMF may initiate location procedures for downlink positioning with the UE. For example, the LMF may send location assistance data to the UE, or obtain a location estimate or location measurement. For example, in step 3b, a capability transfer process may be performed. Specifically, the LMF may request capability information from the UE, and the UE may transmit capability information to the LMF. In this case, the capability information may include information on a location measurement method that the LFM or UE can support, information on various aspects of a specific location measurement method, such as various types of assistance data for A-GNSS, and information on common characteristics that are not limited to any one location measurement method, such as the ability to handle multiple LPP transactions, etc. Meanwhile, in some cases, even if the LMF does not request capability information from the UE, the UE may provide capability information to the LMF.

As another example, a location assistance data transfer process may be performed in step 3b. Specifically, the UE may request location assistance data from the LMF, and may indicate required specific location assistance data to the LMF. Then, the LMF may deliver location assistance data corresponding thereto to the UE, and additionally, may transmit additional assistance data to the UE through one or more additional LPP messages. On the other hand, location assistance data transmitted from the LMF to the UE may be transmitted through a unicast method, and in some cases, the LMF may transmit location assistance data and/or additional assistance data to the UE without the UE requesting assistance data from the LMF.

As another example, a location information transfer process may be performed in step 3b. Specifically, the LMF may request the UE for location-related information related to the UE, and may indicate the type of location information required and the associated QoS. Then, in response to the request, the UE may transmit the location related information to the LMF. In this case, the UE may additionally transmit additional location-related information to the LMF through one or more LPP messages. Here, 'location-related information' may mean all values used for location calculation, such as actual location estimation information and wireless measurement or location measurement, etc, and representatively, there may be a Reference Signal Time Difference (RSTD) value measured by the UE based on downlink reference signals transmitted from a plurality of NG-RAN and/or E-UTRAN to the UE. Similar to the above, the UE may transmit the location-related information to the LMF even if there is no request from the LMF.

On the other hand, the processes made in step 3b described above may be performed independently, but may be performed continuously. In general, step 3b is performed in the order of a capability transfer process, an assistance data transfer process, and a location information transfer process, but is not limited to this order. In other words, step 3b is not limited to a specific order in order to improve the flexibility of location measurement. For example, the UE may request location assistance data at any time to perform the location measurement request already requested by the LMF. In addition, if the location information delivered by the UE does not satisfy the QoS required, the LMF may also request location information, such as location measurements or location estimates, at any time. Similarly, when the UE does not perform measurement for location estimation, the UE may transmit capability information to the LMF at any time.

In addition, when an Error occurs in the information or request exchanged between the LMF and the UE in step 3b, an Error message may be transmitted/received, and an Abort message may be transmitted/received for stopping position measurement.

On the other hand, the protocol used in step 3b may be an LPP protocol, which will be described later.

Meanwhile, step 3b may be additionally performed after step 3a is performed, or may be performed instead of step 3a.

In step 4, the LMF may provide a location service response to the AMF. In addition, the location service response may include information on whether the location estimation of the UE was successful and the location estimate of the UE. After that, if the procedure of FIG. 9 is initiated by step 1a, the AMF may deliver a location service response to a 5GC entity such as GMLC, and if the procedure of FIG. 9 is initiated by step 1b, the AMF may use a location service response to provide a location service related to an emergency call or the like.

In the protocol for location measurement described below, definitions of some terms may be based on Table 8 below.

TABLE 8

NR-Uu interface: The NR-Uu interface, connecting the UE to the gNB over the air, is used as one of several transport links for the LTE Positioning Protocol for a target UE with NR access to NG-RAN.
LTE-Uu interface: The LTE-Uu interface, connecting the UE to the ng-eNB over the air, is used as one of several transport links for the LTE Positioning Protocol for a target UE with LTE access to NG-RAN.
NG-C interface: The NG-C interface between the gNB and the AMF and between the ng-eNB and the AMF is transparent to all UE-positioning-related procedures. It is involved in these procedures only as a transport link for the LTE Positioning Protocol. For gNB related positioning procedures, the NG-C interface transparently transports both positioning requests from the LMF to the gNB and positioning results from the gNB to the LMF. For ng-eNB related positioning procedures, the NG-C interface transparently transports both positioning requests from the LMF to the ng-eNB and positioning results from the ng-eNB to the LMF.
NLs interface: The NLs interface, between the LMF and the AMF, is transparent to all UE related, gNB related and ng-eNB related positioning procedures. It is used only as a transport link for the LTE Positioning Protocols LPP and NRPPa.

LTE Positioning Protocol (LPP)

Figure 10:
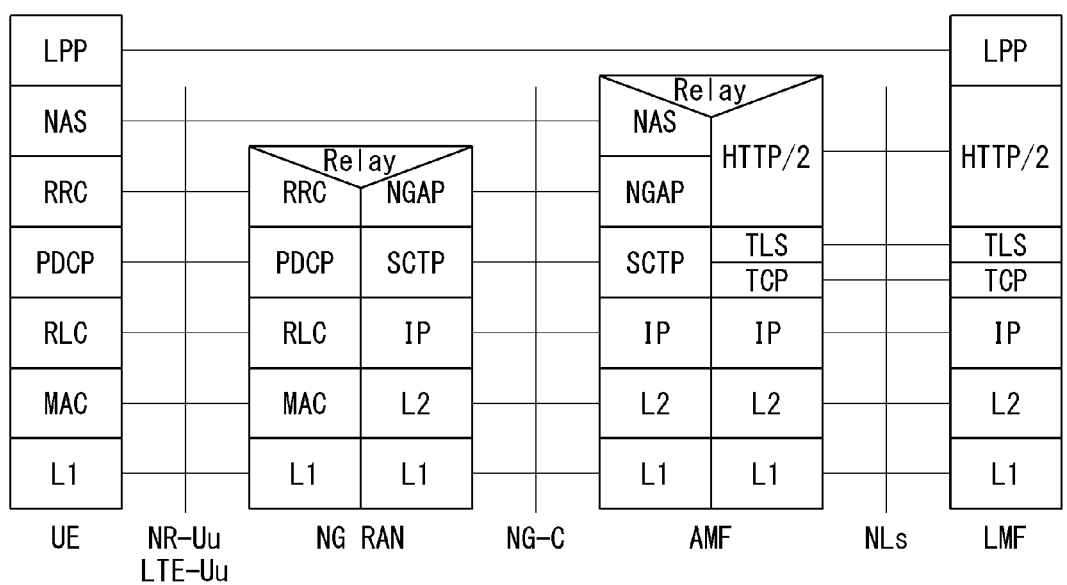
FIG. 10 is a diagram illustrating an example of a protocol layer for supporting LPP message transmission.

FIG. 10 is a diagram illustrating an example of a protocol layer for supporting LPP message transmission.

Referring to FIG. 10, an LPP PDU may be transmitted through a NAS PDU between the MAF and the UE. The LPP may terminate a connection between a target device (e.g. UE in the control plane or SUPL Enabled Terminal (SET) in the user plane) and a location server (e.g. LMF in the control plane or SLP in the user plane). The LPP message may be delivered in the form of a transparent PDU through an intermediate network interface using an appropriate protocol such as NGAP through the NG-C interface, NAS/RRC through the LTE-Uu and NR-Uu interfaces. The LPP protocol enables positioning for NR and LTE based on various positioning methods.

For example, the target device and the location server may exchange capability information, assistance data for positioning, and/or location information with each other through the LPP protocol. In addition, error information exchange and/or an instruction to stop the LPP procedure may be performed through the LPP message.

LPP Procedures for UE Positioning

A signal transmission/reception operation based on the LPP protocol to which the method proposed in the present disclosure can be applied may be performed based on Table 9 below.

TABLE 9

As described above, the protocol operates between a "target" and a "server". In the control-plane context, these entities are the UE and LMF respectively; in the SUPL context they are the SET and the SLP. A procedure may be initiated by either the target or the server.
1) Capability Transfer
Capabilities in an LPP context refer to the ability of a target or server to support different position methods defined for LPP, different aspects of a particular position method (e.g. different types of assistance data for A-GNSS) and common features not specific to only one position method (e.g. ability to handle multiple LPP transactions). These capabilities are defined within the LPP protocol and transferred between the target and the server using LPP transport.
The exchange of capabilities between a target and a server may be initiated by a request or sent as "unsolicited" information. If a request is used, the server sends an LPP Request Capabilities message to the target device with a request for capability information. The target sends an LPP Provide Capabilities message.
Example of LPP Capability Transfer procedure
1. The server may send a request for the LPP related capabilities of the target.
2. The target transfers its LPP-related capabilities to the server. The capabilities may refer to particular position methods or may be common to multiple position methods.
LPP Capability Indication procedure is used for unsolicited capability transfer.
2) Assistance data Transfer
Assistance data may be transferred either by request or unsolicited. In this version of the specification, assistance data delivery is supported only via unicast transport from server to target.
Example of LPP Assistance Data Transfer procedure
1. The target may send a request to the server for assistance data and may indicate the particular assistance data needed.
2. The server transfers assistance data to the target. The transferred assistance data should match any assistance data requested in step 1.
3. Optionally, the server may transfer additional assistance data to the target in one or more additional LPP messages.
LPP Assistance Data Delivery procedure is used for unilateral assistance data transfer. This procedure is unidirectional; assistance data are always delivered from the server to the target.
3) Location Information Transfer
The term "location information" applies both to an actual position estimate and to values used in computing position (e.g., radio measurements or positioning measurements). It is delivered either in response to a request or unsolicited.
Example of LPP Location Information Transfer procedure
1. The server may send a request for location information to the target, and may indicate the type of location information needed and associated QoS.
2. In response to step 1, the target transfers location information to the server. The location information transferred should match the location information requested in step 1.
3. Optionally (e.g., if requested in step 1), the target in step 2 may transfer additional location information to the server in one or more additional LPP messages.

TABLE 9-continued

LPP Location Information Delivery procedure is used for unilateral location information transfer.
Furthermore, the LPP Location Information Delivery procedure can only be piggybacked in the MO-LR request.
4) Multiple Transactions
Multiple LPP transactions may be in progress simultaneously between the same target and server nodes, to improve flexibility and efficiency. However, no more than one LPP procedure between a particular pair of target and server nodes to obtain location information shall be in progress at any time for the same position method.
In this example, the objective is to request location measurements from the target, and the server does not provide assistance data in advance, leaving the target to request any needed assistance data.
Example of multiple LPP procedures
1. The server sends a request to the target for positioning measurements.
2. The target sends a request for particular assistance data.
3. The server returns the assistance data requested in step 2.
4. The target obtains and returns the location information (e.g., positioning method measurements) requested in step 1.
5) Error handling
The procedure is used to notify the sending endpoint by the receiving endpoint that the receiving LPP message is erroneous or unexpected. This procedure is bidirectional at the LPP level; either the target or the server may take the role of either endpoint in the corresponding procedure.
Example of Error handling procedure
1. The target or server sends a LPP message to the other endpoint (i.e, "Server/Target").
2. If the server or target ("Server/Target") detects that the receiving LPP message is erroneous or unexpected, the server or target transfers error indication information to the other endpoint ("Target/Server").
6) Abort
The procedure is used to notify the other endpoint by one endpoint to abort an ongoing procedure between the two endpoints. This procedure is bidirectional at the LPP level; either the target or the server may take the role of either endpoint in the corresponding procedure.
Example of Abort procedure
1. A LPP procedure is ongoing between target and server.
2. If the server or target ("Server/Target") determines that the procedure must be aborted, and then the server or target sends an LPP Abort message to the other endpoint ("Target/Server") carrying the transaction ID for the procedure.

NR Positioning Protocol A (NRPPa)

Figure 11:
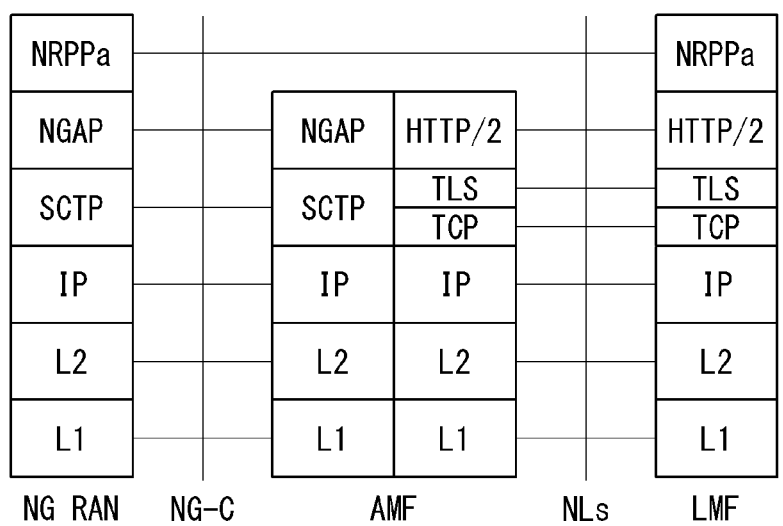
FIG. 11 is a diagram illustrating an example of a protocol layer for supporting NRPPa transmission.

FIG. 11 is a diagram illustrating an example of a protocol layer for supporting NRPPa transmission. Specifically, FIG. 11 illustrates a protocol layer for supporting transmission of an NRPPa PDU (NR Positioning Protocol a Protocol Data Unit).

The NRPPa may be used for information exchange between the NG-RAN node and the LMF. Specifically, the NRPPa may used to exchange E-CID for measurement transmitted from ng-eNB to LMF, data for supporting the OTDOA positioning method, Cell-ID and Cell location ID for the NR Cell ID positioning method, and the like. The AMF may route NRPPa PDUs based on the routing ID of the associated LMF through the NG-C interface even if there is no information on the associated NRPPa transaction.

The procedure of the NRPPa protocol for location and data collection can be divided into two types. The first type is a UE associated procedure for delivering information on a specific UE (e.g. location measurement information, etc.), and the second type is a non-UE associated procedure for delivering information applicable to an NG-RAN node and related TPs (e.g. gNB/ng-eNG/TP timing information, etc.). The two types of procedures may be supported independently or at the same time.

NRPPa Procedure

A signal transmission/reception operation based on the NRPPa protocol to which the embodiments proposed in the present disclosure can be applied may be performed based on Table 10 below.

TABLE 10

Positioning and data acquisition transactions between a LMF and NG-RAN node are modelled by using procedures of the NRPPa protocol. There are two types of NRPPa procedures:
UE associated procedure, i.e. transfer of information for a particular UE (e.g. positioning measurements);
Non UE associated procedure, i.e. transfer of information applicable to the NG-RAN node and associated TPs (e.g. gNB/ng-eNB/TP timing information).
Parallel transactions between the same LMF and NG-RAN node are supported; i.e. a pair of LMF and NG-RAN node may have more than one instance of an NRPPa procedure in execution at the same time.
For possible extensibility, the protocol is considered to operate between a generic "access node" (e.g. ng-eNB) and a "server" (e.g. LMF). A procedure is only initiated by the server.
Example of a single NRPPa transaction
1. Access Node sends NRPPa Procedure Request to Server.
2. Server sends NRPPa Procedure Response to Acces Node.
N. Access Node sends NRPPa Procedure Response (end transaction) to Server. (this step may be omitted).
The exmaple shows a single NRPPa transaction. The transaction is terminated in step 2 in the case of a non UE associated procedure.
For a UE associated procedure to gather information concerning the access node, additional responses may be allowed (e.g. sending of TABLE 10-continued updated information periodically and/or whenever there is some significant change). In this case, the transaction may be ended after some additional responses. In the NRPPa protocol, the described transaction may be realized by the execution of one procedure defined as a request and a response, followed by one or several procedures initiated by the NG-RAN node (each procedure defined as a single message) to realize the additional responses.
An example of LPPa transaction type may be "Location Information Transfer". The term "location information" applies both to an actual position estimate and to values used in computing position (e.g., radio measurements or positioning measurements). It is delivered in response to a request.
Example of Location information transfer
1. The server sends a request for location related information to the NG-RAN node, and indicates the type of location information needed and associated QoS. The request may refer to a particular UE.
2. In response to step 1, the NG-RAN Node transfers location related information to the server. The location related information transferred should match the location related information requested in step 1.
3. If requested in step 1, the NG-RAN node may transfer additional location related information to the server in one or more additional NRPPa messages when the positioning method is E-CID for E-UTRA.

In the present disclosure, a message exchanged (transmitted and received) between a UE (a target device)/location server for positioning and a configuration related to the message may be based on Table 11 below.

TABLE 11

```
RequestCapabilities
The RequestCapabilities message body in a LPP message is used by the location server to
request the target device capabilty information for LPP and the supported individual positioning
methods.
-- ASN1START
RequestCapabilities ::= SEQUENCE {
    criticalExtensions              CHOICE {
        c1                                           CHOICE {
                requestCapabilities-r9          RequestCapabilities-r9-IEs,
                spare3 NULL, spare2 NULL, spare1 NULL
        },
        criticalExtensionsFuture SEQUENCE {}
    }
}
RequestCapabilities-r9-IEs ::= SEQUENCE {
    commonIEsRequestCapabilities                        CommonIEsRequestCapabilities
        OPTIONAL,      -- Need ON
    a-gnss-RequestCapabilities                          A-GNSS-RequestCapabilities
        OPTIONAL,        -- Need ON
    otdoa-RequestCapabilities                           OTDOA-RequestCapabilities
        OPTIONAL,        -- Need ON
    ecid-RequestCapabilities                            ECID-RequestCapabilities
        OPTIONAL,        -- Need ON
    epdu-RequestCapabilities                            EPDU-Sequence
                OPTIONAL,                      -- Need ON
    ...,
    [[      sensor-RequestCapabilities-r13 Sensor-RequestCapabilities-r13
    OPTIONAL,        -- Need ON
            tbs-RequestCapabilities-r13         TBS-RequestCapabilities-r13
        OPTIONAL,        -- Need ON
        wlan-RequestCapabilities-r13     WLAN-RequestCapabilities-r13
    OPTIONAL,        -- Need ON
        bt-RequestCapabilities-r13                          BT-RequestCapabilities-r13
        OPTIONAL     -- Need ON
    ]],
    [[  nr-ECID-RequestCapabilities-r16                NR-ECID-RequestCapabilities-r16
        OPTIONAL,       -- Need ON
        nr-Multi-RTT-RequestCapabilities-r16
        NR-Multi-RTT-RequestCapabilities-r16
                                                    OPTIONAL,     -- Need ON
        nr-DL-AoD-RequestCapabilities-r16
        NR-DL-TDOA-RequestCapabilities-r16  OPTIONAL,      -- Need ON
        nr-DL-TDOA-RequestCapabilities-r16
        NR-DL-TDOA-RequestCapabilities-r16  OPTIONAL,      -- Need ON
```

TABLE 11-continued

```
        nr-UL-RequestCapabilities-r16          NR-UL-RequestCapabilities-r16
    OPTIONAL       -- Need ON
    ]]
  }
}
-- ASN1STOP
ProvideCapabilities
The ProvideCapabilities message body in a LPP message indicates the LPP capabilities of the
target device to the location server.
-- ASN1START
ProvideCapabilities ::= SEQUENCE {
    criticalExtensions              CHOICE {
        c1                                                          CHOICE {
            provideCapabilities-r9              ProvideCapabilities-r9-IEs,
            spare3 NULL, spare2 NULL, spare1 NULL
        },
        criticalExtensionsFuture SEQUENCE {}
    }
}
ProvideCapabilities-r9-IEs ::= SEQUENCE {
    commonIEsProvideCapabilities            CommonIEsProvideCapabilities
        OPTIONAL,
    a-gnss-ProvideCapabilities                              A-GNSS-ProvideCapabilities
                OPTIONAL,
    otdoa-ProvideCapabilities                               OTDOA-ProvideCapabilities
                OPTIONAL,
    ecid-ProvideCapabilities            ECID-ProvideCapabilities
        OPTIONAL,
    epdu-ProvideCapabilities                                EPDU-Sequence
                                    OPTIONAL,
    ...,
    [[    sensor-ProvideCapabilities-r13   Sensor-ProvideCapabilities-r13
    OPTIONAL,
        tbs-ProvideCapabilities-r13                         TBS-ProvideCapabilities-r13
            OPTIONAL,
        wlan-ProvideCapabilities-r13          WLAN-ProvideCapabilities-r13
    OPTIONAL,
        bt-ProvideCapabilities-r13                          BT-ProvideCapabilities-r13
            OPTIONAL
    ]],
    [[    nr-ECID-ProvideCapabilities-r16NR-ECID-ProvideCapabilities-r16
            OPTIONAL,
            nr-Multi-RTT-ProvideCapabilities-r16
    NR-Multi-RTT-ProvideCapabilities-r16      OPTIONAL,
            nr-DL-AoD-ProvideCapabilities-r16
    NR-DL-AoD-ProvideCapabilities-r16           OPTIONAL,
            nr-DL-TDOA-ProvideCapabilities-r16
    NR-DL-TDOA-ProvideCapabilities-r16          OPTIONAL,
            nr-UL-ProvideCapabilities-r16   NR-UL-ProvideCapabilities-r16
    OPTIONAL
    ]]
}
-- ASN1STOP
RequestAssistanceData
The RequestAssistanceData message body in a LPP message is used by the target device to
request assistance data from the location server.
-- ASN1START
RequestAssistanceData ::= SEQUENCE {
    criticalExtensions              CHOICE {
        c1                                                          CHOICE {
            requestAssistanceData-r9        RequestAssistanceData-r9-IEs,
            spare3 NULL, spare2 NULL, spare1 NULL
        },
        criticalExtensionsFuture SEQUENCE {}
    }
}
RequestAssistanceData-r9-IEs ::= SEQUENCE {
    commonIEsRequestAssistanceData                          CommonIEsRequestAssistanceData
            OPTIONAL,
    a-gnss-RequestAssistanceData                    A-GNSS-RequestAssistanceData
    OPTIONAL,
    otdoa-RequestAssistanceData                             OTDOA-RequestAssistanceData
                OPTIONAL,
    epdu-RequestAssistanceData                              EPDU-Sequence
                    OPTIONAL,
    ...,
    [[          sensor-RequestAssistanceData-r14
    Sensor-RequestAssistanceData-r14        OPTIONAL,
        tbs-RequestAssistanceData-r14 TBS-RequestAssistanceData-r14
    OPTIONAL,
        wlan-RequestAssistanceData-r14                      WLAN-RequestAssistanceData-r14
```

TABLE 11-continued

```
            OPTIONAL
    ]],
    [[  nr-Multi-RTT-RequestAssistanceData-r16
    NR-Multi-RTT-RequestAssistanceData-r16                      OPTIONAL,
        nr-DL-AoD-RequestAssistanceData-r16
    NR-DL-AoD-RequestAssistanceData-r16                         OPTIONAL,
        nr-DL-TDOA-RequestAssistanceData-r16
    NR-DL-TDOA-RequestAssistanceData-r16                        OPTIONAL
    ]]
}
-- ASN1STOP
ProvideAssistanceData
The ProvideAssistanceData message body in a LPP message is used by the location server to
provide assistance data to the target device either in response to a request from the target
device or in an unsolicited manner.
-- ASN1START
ProvideAssistanceData ::= SEQUENCE {
    criticalExtensions          CHOICE {
        c1                                                                  CHOICE {
            provideAssistanceData-r9                ProvideAssistanceData-r9-IEs,
            spare3 NULL, spare2 NULL, spare1 NULL
        },
        criticalExtensionsFuture SEQUENCE {}
    }
}
ProvideAssistanceData-r9-IEs ::= SEQUENCE {
    commonIEsProvideAssistanceData                  CommonIEsProvideAssistanceData
        OPTIONAL,      -- Need ON
    a-gnss-ProvideAssistanceData                    A-GNSS-ProvideAssistanceData
    OPTIONAL,      -- Need ON
    otdoa-ProvideAssistanceData                     OTDOA-ProvideAssistanceData
        OPTIONAL,      -- Need ON
    epdu-Provide-Assistance-Data                    EPDU-Sequence
            OPTIONAL,      -- Need ON
    ...,
    [[
    sensor-ProvideAssistanceData-r14                Sensor-ProvideAssistanceData-r14
    OPTIONAL,      -- Need ON
    tbs-ProvideAssistanceData-r14                   TBS-ProvideAssistanceData-r14
    OPTIONAL,      -- Need ON
    wlan-ProvideAssistanceData-r14                  WLAN-ProvideAssistanceData-r14
            OPTIONAL      -- Need ON
    ]],
    [[  nr-Multi-RTT-ProvideAssistanceData-r16
    NR-Multi-RTT-ProvideAssistanceData-r16
                                                    OPTIONAL,      -- Need ON
        nr-DL-AoD-ProvideAssistanceData-r16
    NR-DL-AoD-ProvideAssistanceData-r16 OPTIONAL,           -- Need ON
        nr-DL-TDOA-ProvideAssistanceData-r16
    NR-DL-TDOA-ProvideAssistanceData-r16
                                                    OPTIONAL      -- Need ON
    ]]
}
-- ASN1STOP
ProvideAssistanceData field descriptions
commonIEsProvideAssistanceData
This IE is provided for future extensibility and should not be included in this version of the
protocol.
RequestLocationInformation
The RequestLocationInformation message body in a LPP message is used by the location
server to request positioning measurements or a position estimate from the target device.
-- ASN1START
RequestLocationInformation ::= SEQUENCE {
  criticalExtensions            CHOICE {
    c1                                                                  CHOICE {
        requestLocationInformation-r9   RequestLocationInformation-r9-IEs,
        spare3 NULL, spare2 NULL, spare1 NULL
    },
    criticalExtensionsFuture SEQUENCE {}
  }
}
RequestLocationInformation-r9-IEs ::= SEQUENCE {
  commonIEsRequestLocationInformation
  CommonIEsRequestLocationInformation           OPTIONAL,      -- Need ON
  a-gnss-RequestLocationInformation     A-GNSS-RequestLocationInformation
    OPTIONAL,          -- Need ON
  otdoa-RequestLocationInformation      OTDOA-RequestLocationInformation
    OPTIONAL,          -- Need ON
  ecid-RequestLocationInformation               ECID-RequestLocationInformation
    OPTIONAL,                  -- Need ON
```

TABLE 11-continued

```
epdu-RequestLocationInformation          EPDU-Sequence
                                                           OPTIONAL,    -- Need ON
    ...,
    [[
    sensor-RequestLocationInformation-r13
    Sensor-RequestLocationInformation-r13
                                                           OPTIONAL,    -- Need ON
    tbs-RequestLocationInformation-r13       TBS-RequestLocationInformation-r13
    OPTIONAL,         -- Need ON
    wlan-RequestLocationInformation-r13      WLAN-RequestLocationInformation-r13
    OPTIONAL,         -- Need ON
    bt-RequestLocationInformation-r13        BT-RequestLocationInformation-r13
    OPTIONAL          -- Need ON
    ]],
    [[       nr-ECID-RequestLocationInformation-r16
    NR-ECID-RequestLocationInformation-r16
                                                           OPTIONAL,    -- Need ON
       nr-Multi-RTT-RequestLocationInformation-r16
    NR-Multi-RTT-RequestLocationInformation-r16
                                                           OPTIONAL,    -- Need ON
       nr-DL-AoD-RequestLocationInformation-r16
    NR-DL-AoD-RequestLocationInformation-r16
                                                           OPTIONAL,    -- Need ON
       nr-DL-TDOA-RequestLocationInformation-r16
    NR-DL-TDOA-RequestLocationInformation-r16
                                                           OPTIONAL     -- Need ON
    ]]
}
-- ASN1STOP
RequestLocationInformation field descriptions
commonIEsRequestLocationInformation
This field specifies the location information type requested by the location server and
optionally other configuration information associated with the requested location information.
This field should always be included in this version of the protocol.
ProvideLocationInformation
The ProvideLocationInformation message body in a LPP message is used by the target device to
provide positioning measurements or position estimates to the location server.
-- ASN1START
ProvideLocationInformation ::= SEQUENCE {
    criticalExtensions              CHOICE {
          c1                                                                       CHOICE {
                provideLocationInformation-r9   ProvideLocationInformation-r9-IEs,
                spare3 NULL, spare2 NULL, spare1 NULL
          },
          criticalExtensionsFuture SEQUENCE {}
    }
}
ProvideLocationInformation-r9-IEs ::= SEQUENCE {
    commonIEsProvideLocationInformation
    CommonIEsProvideLocationInformation                  OPTIONAL,
    a-gnss-ProvideLocationInformation                    A-GNSS-ProvideLocationInformation
    OPTIONAL,
    otdoa-ProvideLocationInformation                     OTDOA-ProvideLocationInformation
    OPTIONAL,
    ecid-ProvideLocationInformation                      ECID-ProvideLocationInformation
    OPTIONAL,
    epdu-ProvideLocationInformation                      EPDU-Sequence
                    OPTIONAL,
    ...,
    [[
    sensor-ProvideLocationInformation-r13
    Sensor-ProvideLocationInformation-r13
                                                         OPTIONAL,
    tbs-ProvideLocationInformation-r13       TBS-ProvideLocationInformation-r13
    OPTIONAL,
    wlan-ProvideLocationInformation-r13      WLAN-ProvideLocationInformation-r13
    OPTIONAL,
    bt-ProvideLocationInformation-r13        BT-ProvideLocationInformation-r13
    OPTIONAL
    ]],
    [[       nr-ECID-ProvideLocationInformation-r16
    NR-ECID-ProvideLocationInformation-r16                              OPTIONAL,
       nr-Multi-RTT-ProvideLocationInformation-r16
    NR-Multi-RTT-ProvideLocationInformation-r16 OPTIONAL,
       nr-DL-AoD-ProvideLocationInformation-r16
    NR-DL-AoD-ProvideLocationInformation-r16     OPTIONAL,
       nr-DL-TDOA-ProvideLocationInformation-r16
    NR-DL-TDOA-ProvideLocationInformation-r16   OPTIONAL
    ]]
}
```

TABLE 11-continued

```
-- ASN1STOP
-- ASN1START
OTDOA-SignalMeasurementInformation ::= SEQUENCE {
    systemFrameNumber              BIT STRING (SIZE (10)),
    physCellIdRef                  INTEGER (0..503),
    cellGlobalIdRef                ECGI                            OPTIONAL,
    earfcnRef                      ARFCN-ValueEUTRA       OPTIONAL,
        -- Cond NotSameAsRef0
    referenceQuality               OTDOA-MeasQuality      OPTIONAL,
    neighbourMeasurementList       NeighbourMeasurementList,
    ...,
    [[ earfcnRef-v9a0              ARFCN-ValueEUTRA-v9a0    OPTIONAL
    -- Cond NotSameAsRef1
    ]],
    [[ tpIdRef-r14                 INTEGER (0..4095)                OPTIONAL,
    -- Cond ProvidedByServer0
        prsIdRef-r14               INTEGER (0..4095)                OPTIONAL,
    -- Cond ProvidedByServer1
        additionalPathsRef-r14
                                               AdditionalPathList-r14    OPTIONAL,
        nprsIdRef-r14              INTEGER (0..4095)                      OPTIONAL,
    -- Cond ProvidedByServer2
        carrierFreqOffsetNB-Ref-r14
                                                   CarrierFreqOffsetNB-r14
    OPTIONAL,       -- Cond NB-IoT
        hyperSFN-r14               BIT STRING (SIZE (10))             OPTIONAL
    -- Cond H-SFN
    ]],
    [[
        motionTimeSource-r15    MotionTimeSource-r15                     OPTIONAL
    ]]
}
NeighbourMeasurementList ::= SEQUENCE (SIZE(1 .. 24)) OF NeighbourMeasurementElement
NeighbourMeasurementElement ::= SEQUENCE {
    physCellIdNeighbour            INTEGER (0..503),
    cellGlobalIdNeighbour    ECGI                                       OPTIONAL,
    earfcnNeighbour                ARFCN-ValueEUTRA                     OPTIONAL,
        -- Cond NotSameAsRef2
    rstd                                             INTEGER (0..12711),
    rstd-Quality                   OTDOA-MeasQuality,
    ...,
    [[ earfcnNeighbour-v9a0ARFCN-ValueEUTRA-v9a0        OPTIONAL                --
Cond NotSameAsRef3
    ]],
    [[ tpIdNeighbour-r14    INTEGER (0..4095)          OPTIONAL,                --
Cond ProvidedByServer0
        prsIdNeighbour-r14         INTEGER (0..4095)               OPTIONAL,
    -- Cond ProvidedByServer1
        delta-rstd-r14             INTEGER (0..5)                  OPTIONAL,
        additionalPathsNeighbour-r14
                                              AdditionalPathList-r14   OPTIONAL,
        nprsIdNeighbour-r14        INTEGER (0..4095)                    OPTIONAL,
    -- Cond ProvidedByServer2
        carrierFreqOffsetNB-Neighbour-r14
                                                   CarrierFreqOffsetNB-r14
    OPTIONAL       -- Cond NB-IOT
    ]],
    [[
        delta-SFN-r15              INTEGER (-8192..8191)OPTIONAL
    ]]
}
AdditionalPathList-r14 ::= SEQUENCE (SIZE(1..maxPaths-r14)) OF AdditionalPath-r14
maxPaths-r14    INTEGER ::= 2
MotionTimeSource-r15 ::= SEQUENCE {
        timeSource-r15                   ENUMERATED  {servingCell,  referenceCell,
gnss, mixed,
                                                                              other,
none, ...}
}
-- ASN1STOP
-- ASN1START
ECID-SignalMeasurementInformation ::= SEQUENCE {
    primaryCellMeasuredResults     MeasuredResultsElement       OPTIONAL,
    measuredResultsList            MeasuredResultsList,
    ...
}
MeasuredResultsList ::= SEQUENCE (SIZE(1..32)) OF MeasuredResultsElement
MeasuredResultsElement ::= SEQUENCE {
    physCellId                                                      INTEGER (0..503),
    cellGlobalId                                       CellGlobalIdEUTRA-AndUTRA
```

TABLE 11-continued

```
        OPTIONAL,
        arfcnEUTRA                                      ARFCN-ValueEUTRA,
        systemFrameNumber                               BIT STRING (SIZE (10))
        OPTIONAL,
        rsrp-Result                                     INTEGER (0..97)
                OPTIONAL,
        rsrq-Result                                     INTEGER (0..34)
                OPTIONAL,
        ue-RxTxTimeDiff                                 INTEGER (0..4095)
            OPTIONAL,
        ...,
        [[    arfcnEUTRA-v9a0                           ARFCN-ValueEUTRA-v9a0
            OPTIONAL                  -- Cond EARFCN-max
        ]],
        [[    nrsrp-Result-r14                          INTEGER (0..113)
        OPTIONAL,
            nrsrq-Result-r14                            INTEGER (0..74)
            OPTIONAL,
            carrierFreqOffsetNB-r14                     CarrierFreqOffsetNB-r14
        OPTIONAL,            -- Cond NB-IoT
            hyperSFN-r14                                BIT STRING (SIZE (10))
        OPTIONAL
        ]],
        [[
            rsrp-Result-v1470                           INTEGER (-17..-1)
        OPTIONAL,
            rsrq-Result-v1470                           INTEGER (-30..46)
        OPTIONAL
        ]]
}
-- ASN1STOP
-- ASN1START
NR-DL-TDOA-SignalMeasurementInformation-r16 ::= SEQUENCE {
    dl-PRS-ReferenceInfo-r16           DL-PRS-IdInfo-r16,
    nr-DL-TDOA-MeasList-r16            NR-DL-TDOA-MeasList-r16,
    ...
}
NR-DL-TDOA-MeasList-r16        ::=       SEQUENCE      (SIZE(1.. nrMaxTRPs)) OF
NR-DL-TDOA-MeasElement-r16
NR-DL-TDOA-MeasElement-r16 ::= SEQUENCE {
    trp-ID-r16                                          TRP-ID-r16
        OPTIONAL,
    nr-DL-PRS-ResourceId-r16                  NR-DL-PRS-ResourceId-r16   OPTIONAL,
    nr-DL-PRS-ResourceSetId-r16               NR-DL-PRS-ResourceSetId-r16 OPTIONAL,
    nr-TimeStamp-r16                          NR-TimeStamp-r16,
nr-RSTD-r16                                             INTEGER (0..ffs),   -- FFS
on the value range
    nr-AdditionalPathList-r16                 NR-AdditionalPathList-r16
        OPTIONAL,
    nr-TimingMeasQuality-r16                            NR-TimingMeasQuality-r16,
    nr-PRS-RSRP-Result-r16                              INTEGER (FFS)
        OPTIONAL, -- FFS, value range to be decided in RAN4.
    nr-DL-TDOA-AdditionalMeasurements-r16
    NR-DL-TDOA-AdditionalMeasurements-r16,
    ...
}
NR-DL-TDOA-AdditionalMeasurements-r16    ::=    SEQUENCE    (SIZE    (1..3))    OF
NR-DL-TDOA-AdditionalMeasurementElement-r16
NR-AdditionalPathList-r16 ::= SEQUENCE (SIZE(1..2)) OF NR-AdditionalPath-r16
NR-DL-TDOA-AdditionalMeasurementElement-r16 ::= SEQUENCE {
    nr-DL-PRS-ResourceId-r16                  NR-DL-PRS-ResourceId-r16
OPTIONAL,
    nr-DL-PRS-ResourceSetId-r16               NR-DL-PRS-ResourceSetId-r16 OPTIONAL,
    nr-TimeStamp-r16                          NR-TimeStamp-r16,
    nr-RSTD-ResultDiff-r16                    INTEGER (0..ffs),    -- FFS on the value
range to be decided in RAN4
    dl-PRS-RSRP-ResultDiff-r16     INTEGER (FFS)        OPTIONAL, -- FFS on
the value range to be decided in RAN4
    nr-AdditionalPathList-r16                 NR-AdditionalPathList-r16
        OPTIONAL,
    ...
}
nrMaxTRPs       INTEGER ::= 256             -- Max TRPs per UE
-- ASN1STOP
-- ASN1START
NR-DL-AoD-SignalMeasurementInformation-r16 ::= SEQUENCE {
    nr-DL-AoD-MeasList-r16                    NR-DL-AoD-MeasList-r16,
    ...
}
NR-DL-AoD-MeasList-r16       ::=       SEQUENCE      (SIZE(1..nrMaxTRPs))    OF
```

TABLE 11-continued

```
NR-DL-AoD-MeasElement-r16
NR-DL-AoD-MeasElement-r16 ::= SEQUENCE {
    trp-ID-r16                                              TRP-ID-r16
        OPTIONAL,
    nr-DL-PRS-ResourceId-r16            NR-DL-PRS-ResourceId-r16
OPTIONAL,
    nr-DL-PRS-ResourceSetId-r16         NR-DL-PRS-ResourceSetId-r16
OPTIONAL,
    nr-TimeStamp-r16                                    NR-TimeStamp-r16,
    nr-PRS-RSRP-Result-r16                              INTEGER (FFS)
            OPTIONAL, -- Need RAN4 inputs on value range
    nr-DL-PRS-RxBeamIndex-r16                           INTEGER (1..8),
    nr-TimingMeasQuality-r16                            NR-TimingMeasQuality-r16,
    nr-DL-Aod-AdditionalMeasurements-r16
    NR-DL-AoD-AdditionalMeasurements-r16,
    ...
}
NR-DL-AoD-AdditionalMeasurements-r16    ::=    SEQUENCE (SIZE (1..7))    OF
NR-DL-AoD-AdditionalMeasurementElement-r16
NR-DL-AoD-MeasurementElement-r16 ::= SEQUENCE {
    nr-DL-PRS-ResourceId-r16            NR-DL-PRS-ResourceId-r16
OPTIONAL,
    nr-DL-PRS-ResourceSetId-r16                  NR-DL-PRS-ResourceSetId-r16
OPTIONAL,
    nr-TimeStamp-r16                                    NR-TimeStamp-r16,
    nr-PRS-RSRP-ResultDiff-r16                          INTEGER (FFS)
        OPTIONAL, -- Need RAN4 inputs on value range
    nr-DL-PRS-RxBeamIndex-r16                           INTEGER (1..8),
    ...
}
nrMaxTRPs           INTEGER ::= 256             -- Max TRPs
-- ASN1STOP
-       NR-TimeStamp
The IE NR-TimeStamp defines the UE measurement associated time stamp.
-- ASN1START
NR-TimeStamp-r16 ::= SEQUENCE {
    dl-PRS-ID-r16                   INTEGER (0..255),
    nr-PhysCellID-r16               NR-PhysCellID-r16
    OPTIONAL,       -- Need ON
    nr-CellGlobalID-r16             NCGI-r15
    OPTIONAL,       -- Need ON
    nr-ARFCN-r16                ARFCN-VALUENR-r15
    OPTIONAL,        -- Cond NotSameAsRefServ
    nr-SFN-r16                      INTEGER (0..1023),
    nr-Slot-r16                  CHOICE {
            scs15-r16                               INTEGER (0..9),
            scs30-r16                               INTEGER (0..19),
            scs60-r16                               INTEGER (0..39),
            scs120-r16                              INTEGER (0..79)
    },
    ...
}
-- ASN1STOP
Conditional presence    Explanation
NotSameAsRefServ0       The field is mandatory present if the SFN is not from the reference
                        TRP; otherwise it is not present.
```

Positioning Measurement Method

The positioning measurement methods supported by NG-RAN may include GNSS, OTDOA, E-CID (enhanced cell ID), Multi RTT (round trip time)/Multi-cell RTT, barometric pressure sensor positioning, WLAN positioning, Bluetooth positioning, and TBS (terrestrial beacon system), UTDOA (Uplink Time Difference of Arrival), etc. Among the positioning measurement methods, any one positioning measurement method may be used to measure the location of the UE, but two or more positioning measurement methods may be used to measure the location of the UE.

In the positioning measurement method described below, definitions of some terms may be based on Table 12 below.

TABLE 12

| | 5.1.13 Reference signal time difference (RSTD) for E-UTRA |
|---|---|
| Definition | The relative timing difference between the E-UTRA neighbour cell j and the E-UTRA reference cell i, defined as TSubframeRxj − TSubframeRxi, where: TSubframeRxj is the time when the UE receives the start of one subframe from E-UTRA cell j TSubframeRxi is the time when the UE receives the corresponding start of one subframe from E-UTRA cell i that |

TABLE 12-continued

| | |
|---|---|
| | is closest in time to the subframe received from E-UTRA cell j. The reference point for the observed subframe time difference shall be the antenna connector of the UE. |
| Applicable for | RRC_CONNECTED inter-RAT |

5.1.28 DL PRS reference signal received power (DL PRS-RSRP)

| | |
|---|---|
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |

5.1.29 DL relative signal time difference (DL RSTD)

| | |
|---|---|
| Definition | DL relative timing difference (DL RSTD) between the positioning node j and the reference positioning node i, is defined as TSubframeRxj − TSubframeRxi, Where: TSubframeRxj is the time when the UE receives the start of one subframe from positioning node j. TSubframeRxi is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

5.1.29 DL reference signal time difference (DL RSTD)

| | |
|---|---|
| Definition | DL reference signal time difference (DL RSTD) is the DL relative timing difference between the positioning node j and the reference positioning node i, defined as TSubframeRxj − TSubframeRxi, Where: TSubframeRxj is the time when the UE receives the start of one subframe from positioning node j. TSubframeRxi is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

5.1.30 UE Rx − Tx time difference

| | |
|---|---|
| Definition | The UE Rx − Tx time difference is defined as TUE-RX − TUE-TX Where: TUE-RX is the UE received timing of downlink subframe #i from a positioning node, defined by the first detected path in time. TUE-TX is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for TUE-RX measurement shall be the Rx antenna connector of the UE and the reference point for TUE-TX measurement shall be the Tx antenna connector of the UE. For frequency range 2, the reference point for TUE-RX measurement shall be the Rx antenna of the UE and the reference point for TUE-TX measurement shall be the Tx antenna of the UE. |
| Applicable for | RRC_CONNECTED intra-frequency RRC_CONNECTED inter-frequency |

5.2.2 UL Relative Time of Arrival (TUL-RTOA)

| | |
|---|---|
| Definition | [The UL Relative Time of Arrival (TUL-RTOA) is the beginning of subframe i containing SRS received in positioning node j, relative to the configurable reference time.] Multiple SRS resources for positioning can be used to determine the beginning of one subframe containing SRS received at a positioning node. |

TABLE 12-continued

| | |
|---|---|
| | The reference point for TUL-RTOA shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array<br>Boundary connector. |
| | 5.2.3 gNB Rx – Tx time difference |
| Definition | The gNB Rx – Tx time difference is defined as TgNB-RX – TgNB-TX<br>Where:<br>TgNB-RX is the positioning node received timing of uplink subframe #i containing<br>SRS associated with UE, defined by the first detected path in time.<br>TgNB-TX is the positioning node transmit timing of downlink subframe #j that is<br>closest in time to the subframe #i received from the UE.<br>Multiple SRS resources for positioning can be used to determine the start of one<br>subframe containing SRS.<br>The reference point for TgNB-RX shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array<br>Boundary connector.<br>The reference point for TgNB-TX shall be:<br>for type 1-C base station TS 38.104 [9]: the Tx antenna connector,<br>for type 1-O or 2-O base station TS 38.104 [9]: the Tx antenna,<br>for type 1-H base station TS 38.104 [9]: the Tx Transceiver Array<br>Boundary connector. |
| | 5.2.4 UL Angle of Arrival (UL AoA) |
| Definition | UL Angle of Arrival (UL AoA) is defined as the estimated azimuth angle and<br>vertical angle of a UE with respect to a reference direction, wherein the reference<br>direction is defined:<br>In the global coordinate system (GCS), wherein estimated azimuth angle<br>is measured relative to geographical North and is positive in a counter-clockwise<br>direction and estimated vertical angle is measured relative to zenith and positive<br>to horizontal direction<br>In the local coordinate system (LCS), wherein estimated azimuth angle is<br>measured relative to x-axis of LCS and positive in a counter-clockwise direction<br>and estimated vertical angle is measured relatize to z-axis of LCS and positive to<br>x-y plane direction. The bearing, downtilt and slant angles of LCS are defined<br>according to TS 38.901 [14].<br>The UL AoA is determined at the gNB antenna for an UL channel corresponding<br>to this UE. |
| | 5.2.5 UL SRS reference signal received power (UL SRS-RSRP) |
| Definition | UL SRS reference signal received power (UL SRS-RSRP) is defined as linear<br>average of the power contributions (in [W]) of the resource elements carrying<br>sounding reference signals (SRS). UL SRS-RSRP shall be measured over the<br>configured resource elements within the considered measurement frequency<br>bandwidth in the configured measurement time occasions.<br>For frequency range 1, the reference point for the UL SRS-RSRP shall be the<br>antenna connector of the gNB. For frequency range 2, UL SRS-RSRP shall be<br>measured based on the combined signal from antenna elements corresponding<br>to a given receiver branch. For frequency range 1 and 2, if receiver diversity is in<br>use by the gNB, the reported UL SRS-RSRP value shall not be lower than the<br>corresponding UL SRS-RSRP of any of the individual receiver branches. |

OTDOA (Observed Time Difference of Arrival)

Figure 12:
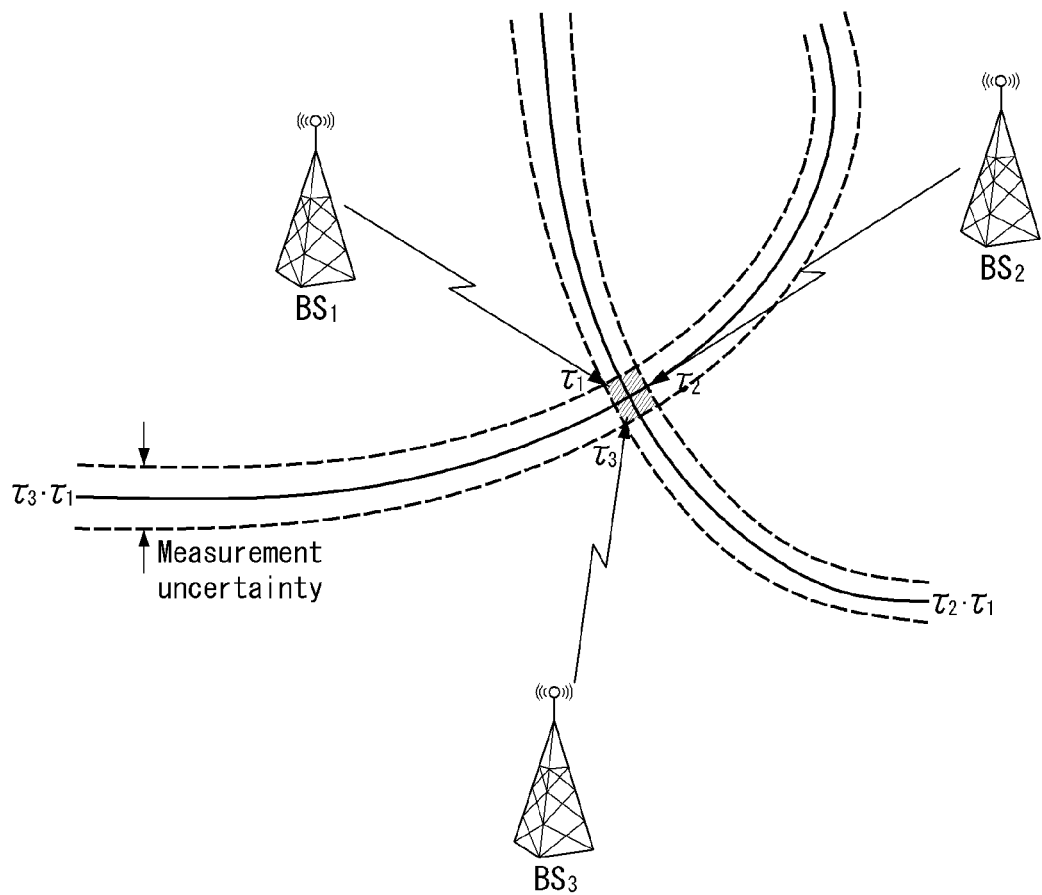
FIG. 12 is a diagram illustrating an example of an OTDOA positioning measurement method.

FIG. 12 is a diagram illustrating an example of an OTDOA positioning measurement method.

In the OTDOA positioning measurement method uses the measurement timing of downlink signals received by the UE from multiple TPs including an eNB, an ng-eNB, and a PRS-only TP. The UE measures the timing of the received downlink signals by using the location assistance data received from the location server. In addition, the location of the UE may be determined based on these measurement results and the geographic coordinates of the contiguous TPs.

A UE connected to the gNB may request a measurement gap for OTDOA measurement from the TP. If the UE does not recognize the SFN for at least one TP in the OTDOA assistance data, the UE may use the autonomous gap to obtain the SFN of the OTDOA reference cell before requesting the measurement gap for performing Reference Signal Time Difference (RSTD) measurement.

Here, the RSTD may be defined based on the smallest relative time difference between the boundaries of two subframes respectively received from the reference cell and the measurement cell. That is, it may be calculated based on the relative time difference between the start times of the subframes of the reference cell closest to the start time of the subframe received from the measurement cell. Meanwhile, the reference cell may be selected by the UE.

For accurate OTDOA measurement, it is necessary to measure the time of arrival (TOA) of a signal received from three or more geographically dispersed TPs or base stations. For example, the TOA for each of TP 1, TP 2 and TP 3 may be measured, the RSTD for TP 1-TP 2, the RSTD for TP 2-TP 3, and the RSTD for TP 3-TP 1 may be calculated based on the three TOAs, a geometric hyperbola may be determined based on this, and a point where these hyperbola intersects may be estimated as the location of the UE. In this case, since accuracy and/or uncertainty for each TOA measurement may occur, the estimated location of the UE may be known as a specific range depending on the measurement uncertainty.

For example, RSTDs for two TPs may be calculated based on Equation 3 below.

$$RSTD_{i,1} \frac{-\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 3]

Here, c may be the speed of light, {xt, yt} may be the (unknown) coordinates of the target UE, {xi, yi} may be the coordinates of the (known) TP, and {25, y1} may be the coordinates of the reference TP (or other TP). Here, (Ti–T1) is a transmission time offset between two TPs, which may be referred to as "Real Time Differences" (RTDs), and ni and n1 may represent values related to UE TOA measurement errors.

E-CID (Enhanced Cell ID)

In the cell ID (CID) positioning measurement method, the location of the UE may be measured through geographic information of the serving ng-eNB, the serving gNB and/or the serving cell of the UE. For example, geographic information of the serving ng-eNB, the serving gNB, and/or the serving cell may be obtained through paging, registration, or the like.

Meanwhile, the E-CID positioning measurement method may use additional UE measurement and/or NG-RAN radio resources and the like for improving the UE location estimate in addition to the CID positioning measurement method. In the E-CID positioning measurement method, some of the same measurement methods as those of the measurement control system of the RRC protocol may be used, but in general, additional measurement is not performed only for the location measurement of the UE. In other words, a separate measurement configuration or measurement control message may not be provided to measure the location of the UE, and the UE also does not expect that an additional measurement operation only for location measurement will be requested, and the UE may report a measurement value obtained through generally measurable measurement methods.

For example, the serving gNB may implement the E-CID positioning measurement method using the E-UTRA measurement provided from the UE.

An example of a measurement element that can be used for E-CID positioning may be as follows.

UE measurement: E-UTRA RSRP (Reference Signal Received Power), E-UTRA RSRQ (Reference Signal Received Quality), UE E-UTRA reception-transmission time difference (Rx-Tx Time difference), GERAN/WLAN RSSI (Reference Signal Strength Indication), UTRAN CPICH (Common Pilot Channel) RSCP (Received Signal Code Power), UTRAN CPICH Ec/Io E-UTRAN measurement: ng-eNB reception-transmission time difference (Rx-Tx Time difference), timing advance (Timing Advance; TADV), Angle of Arrival (AoA)

Here, TADV may be divided into Type 1 and Type 2 as follows.

TADV Type 1=(ng-eNB reception-transmission time difference)+(UE E-UTRA reception-transmission time difference)

TADV Type 2=ng-eNB reception-transmission time difference

On the other hand, AoA may be used to measure the direction of the UE. AoA may be defined as an estimated angle for the location of the UE in a counterclockwise direction from the base station/TP. In this case, the geographic reference direction may be north. The base station/TP may use an uplink signal such as a sounding reference signal (SRS) and/or a demodulation reference signal (DMRS) for AoA measurement. In addition, the larger the antenna array arrangement, the higher the AoA measurement accuracy, when the antenna arrays are arranged at the same interval, signals received from contiguous antenna elements may have a constant phase-rotate.

UTDOA (Uplink Time Difference of Arrival)

UTDOA is a method of determining the location of the UE by estimating the arrival time of the SRS. When calculating the estimated SRS arrival time, the location of the UE may be estimated through the difference in arrival time with another cell (or base station/TP) by using the serving cell as a reference cell. To implement UTDOA, the E-SMLC may instruct the serving cell of the target UE to instruct the target UE to transmit SRS. In addition, the E-SMLC may provide configuration such as whether the SRS is periodic/aperiodic, bandwidth, and frequency/group/sequence hopping, etc.

Multi RTT (Multi-Cell RTT)

Unlike OTDOA, which requires fine synchronization (e.g. nano-second level) between TPs in the network, RTT is based on TOA measurement like the OTDOA, but requires only coarse TRP (e.g. base station) timing synchronization. Hereinafter, it will be described in detail with reference to FIGS. 13A and 13B.

Figure 13A:
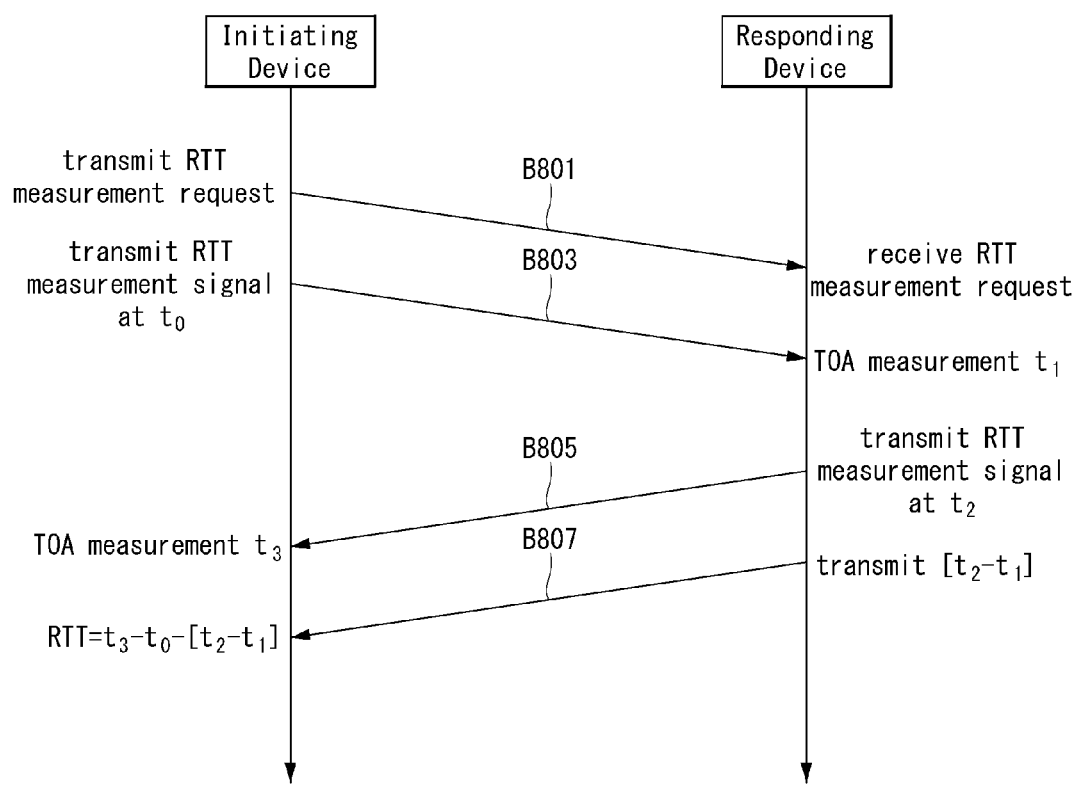
FIGS. 13A and 13B are diagrams illustrating an example of a Multi RTT positioning measurement method.
Figure 13B:
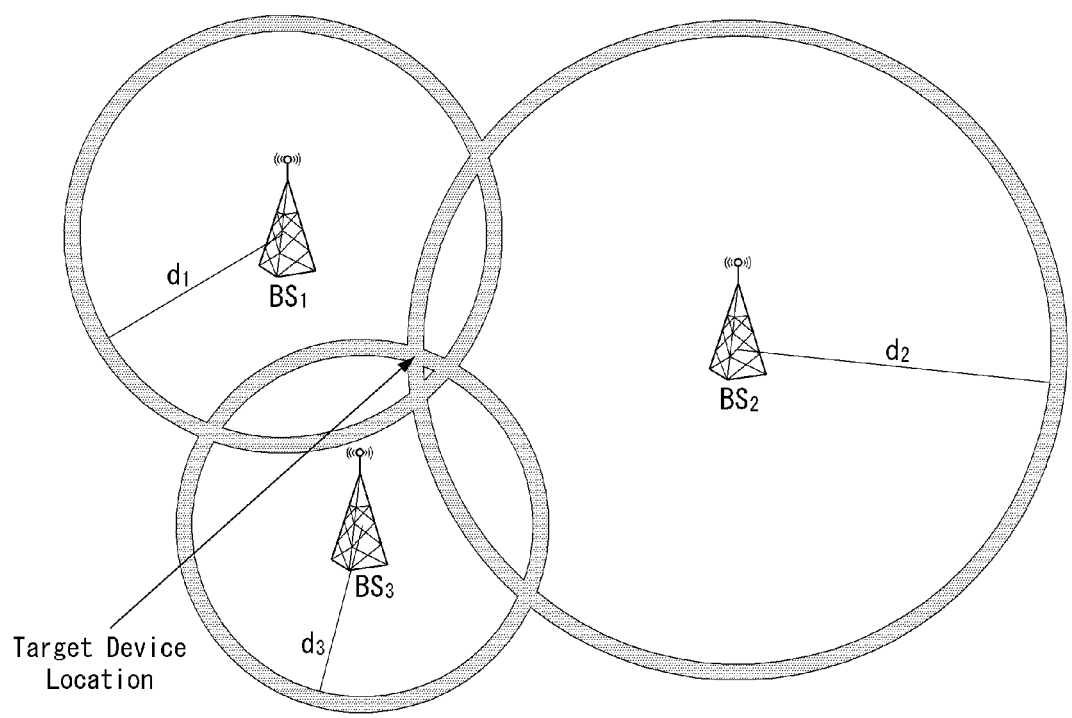

FIGS. 13A and 13B are diagrams illustrating an example of a Multi RTT positioning measurement method.

Referring to FIG. 13A, an RTT process, in which TOA measurement is performed in an initiating device and a responding device, and the responding device provides the TOA measurement to the initiating device for RTT measurement (calculation), is exemplified. For example, the initiating device may be a TRP and/or a UE, and the responding device may be the UE and/or the TRP.

In operation B801 based on an exemplary embodiment, the initiating device may transmit an RTT measurement request, and the responding device may receive it.

In operation B803 based on an exemplary embodiment, the initiating device may transmit an RTT measurement signal at t0, and the responding device may acquire a TOA measurement t1.

In operation B805 based on an exemplary embodiment, the responding device may transmit the RTT measurement signal at t2, and the initiating device may acquire a TOA measurement t3.

In operation B807 based on an exemplary embodiment, the responding device may transmit information on [t2−t1], and the initiating device may receive the corresponding information and calculate the RTT based on Equation 4 below. The corresponding information may be transmitted/received based on a separate signal, or may be transmitted/received by being included in the RTT measurement signal of B805.

$$RTT = t_3 - t_0 - [t_2 - t_1]$$ [Equation 4]

Referring to FIG. 13B, the corresponding RTT may correspond to double-range measurement between two devices. Positioning estimation may be performed from the corresponding information, and a multilateration technique may be used. Based on the measured RTT, d1, d2, and d3 may be determined, and the target device location may be determined by the intersection of the circumference with each BS1, BS2, BS3 (or TRP) as a center and each d1, d2, and d3 as a radius.

The above-described contents (3GPP system, positioning protocol, procedure for measuring the location of the UE, positioning measurement method, etc.) may be applied in combination with methods proposed in the present disclosure be described later, or may be supplemented to clarify the technical characteristics of the methods proposed in the present disclosure. Methods to be described below are divided for convenience of description, and of course, some components of any one method may be substituted with some components of another method, or may be applied in combination with each other. That is, the various embodiments of the present disclosure described below may be combined in whole or in part to constitute other various embodiments of the present disclosure unless mutually excluded, which can be clearly understood by those of ordinary skill in the art.

Hereinafter, matters related to the technical problems of the embodiments to be described later will be described.

In the case of angle-based positioning measurement, performance is greatly affected depending on beam alignment between gNB/TRP and the UE. In fact, even if the UE uses the configured Tx spatial beam related to the SRS resource, the Tx spatial beam used for transmission may deviate from the LoS direction between the UE and each TRP. In addition, when the UE transmits SRS, a method for reducing overhead for beam sweeping is also required.

In the case of angle-based positioning measurement, performance is greatly affected depending on beam alignment between gNB/TRP and the UE. In fact, even if the UE uses the configured Tx spatial beam related to the SRS resource, the Tx spatial beam used for transmission may deviate from the LoS direction between the UE and each TRP. In the present disclosure, a method for improving the performance of angle based measurement among methods used for calculating the location of the UE will be described. That is, an object of the embodiments described below is related to beam alignment between a UE and a base station (TRP) for improving performance of angle based measurement. Hereinafter, a method for improving the performance of the angle based measurement will be described for each UL/DL scenario.

UL Angle Based Measurement
Expected AoA/ZoA

Conventionally, the LMF delivers a search window (expected RSTD and uncertainty) to each TRP for efficient measurement of timing related positioning. However, this information (i.e. search window) cannot be helpful for angle based measurement.

As a method for improving the angle based method, a method of setting an angle based search window similar to the search window (expected RSTD and uncertainty) may be considered. Specifically, the angle based search window may be defined to include at least one of expected AoA and/or uncertainty (angle range). As an example, the LMF may deliver information on the angle-based search window to each TRP. Effects according to this embodiment are as follows.

There may be a gain for beam alignment between the UE and the TRP, the search window (angle) in the TRP may be reduced, it may be helpful for Rx beam configuration. In addition, the above-described embodiment may be used for LoS/N-LoS filtering. Here, LoS may mean a line of sight, and N-LoS may mean a non-line of sight.

In relation to the above-described information for the angle-based search window, expected UL-AoA/ZoA may be utilized from the side of the base station. Also, uncertainty (i.e. range of angle) for expected UL-AoD/ZoD and the corresponding angle (expected UL-AoD/ZoD) may be utilized for enhancement in the UE side.

The expected UL-AoZ/AoZ (AoD/ZoD) value is generated based on the location of the existing target UE in the LMF, and the generated value is delivered to the UE through the LPP message. The generated value may be delivered to the base station through NRPPa. The UE refers to the received expected UL-AoZ/AoZ (AoD/ZoD) value, but may not always operate based on the corresponding value. That is, an operation based on the value of expected UL-AoZ/ AoZ (AoD/ZoD) may not be forced on the UE. The corresponding value may be delivered to the UE when a measurement request is requested.

Hereinafter, DL/UL expected AoA/ZoA (AoD/AoD) for positioning and range (uncertainty) for it will be described with reference to FIGS. 14 and 15.

Figure 14:
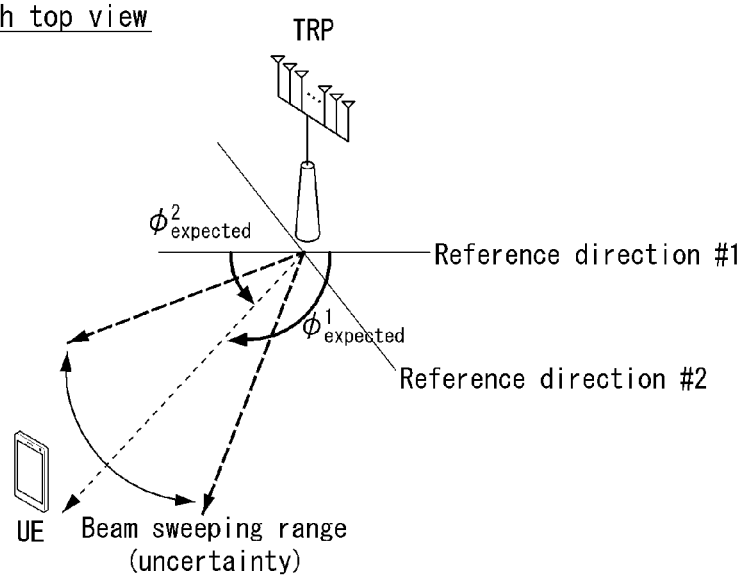
FIG. 14 and FIG. 15 are a diagram illustrating an angle and a range of the angle for positioning according to an embodiment of the present disclosure.
Figure 14:
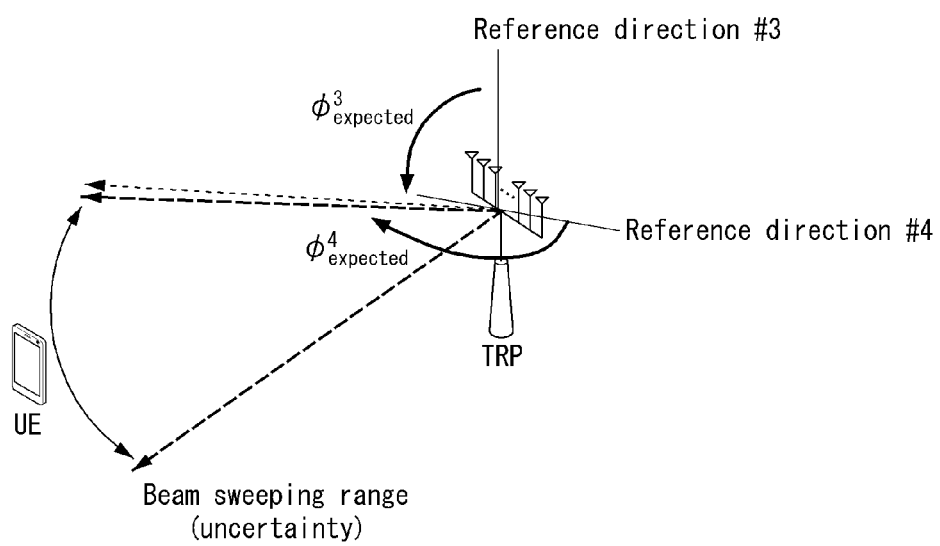
Figure 15:
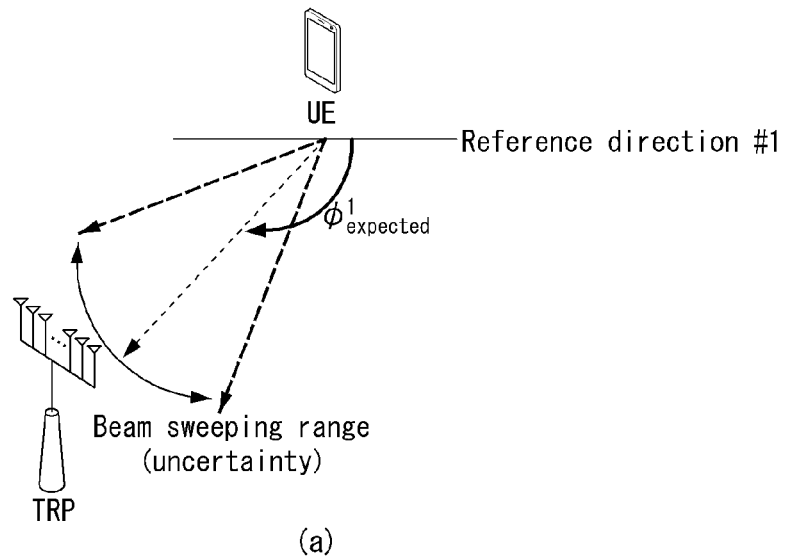
Figure 15:
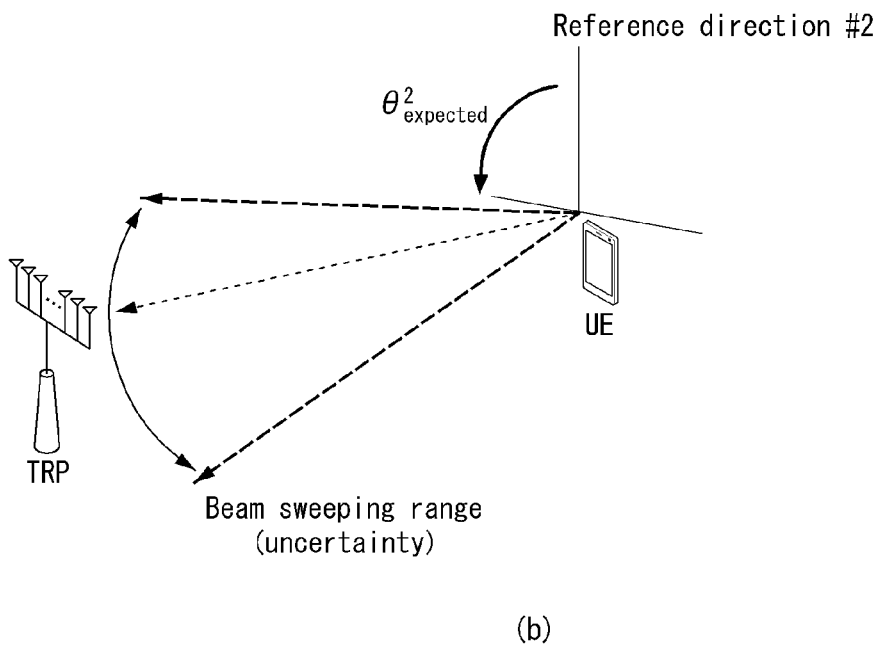

FIGS. 14 and 15 are diagrams illustrating an angle and a range of the angle for positioning according to an embodiment of the present disclosure. Specifically, FIGS. 14 and 15 exemplify the expected AoA/ZoA and uncertainty considering reference angle (direction). FIG. 14 is related to reception (transmission of TRP) of the UE (DL expected AoA/ZoA (AoD/AoD)), and FIG. 15 is related to transmission (reception of TRP) of the UE (UL expected AoA/ZoA (AoD/AoD)).

Referring to FIG. 14, the uncertainty considering reference angle (direction) may mean a range of angles related to beam sweeping (beam sweeping range) based on a reference direction (e.g. Reference directions #1 to #4) of a signal (e.g. PRS) transmitted by the TRP.

$\phi_{expected}^1$ to $\phi_{expected}^4$ in FIG. 14 exemplify expected AoA/ZoA, respectively when the reference direction is #1 to #4. When a single expected AoA/ZoA is given, the value may be interpreted differently depending on the reference direction (reference angle) and rotation as shown in FIG. 14. From this point of view, a clear notation for setting the expected AoA/ZoA should be defined. The simplest way to indicate the expected AoA/ZoA is to apply the notation used for the azimuth setting for the DL-PRS resource as follows (refer to TS 37.355). The notation used to set the azimuth for the DL-PRS resource may be based on Table 13 below.

TABLE 13

For a Global Coordinate System (GCS), the azimuth angle is measured counter-clockwise from geographical North.
For a Local Coordinate System (LCS), the azimuth angle is measured counter-clockwise from the x-axis of the LCS.
Scale factor 1 degree; range 0 to 359 degrees.

That is, the expected AoA/ZoA may be set to a value expressed based on at least one of GCS and LCS. In addition, it is necessary to determine a method of interpreting the uncertainty representing the range of the angle (i.e. the range of angles based on uncertainty). That is, it may be interpreted that the TRP operates differently based on the uncertainty.

Referring to (b) of FIG. 14, an angle expected AoA may be a starting point of a beam sweeping operation. In this case, it is required to set whether the direction of the beam sweeping operation is clockwise or counterclockwise. For example, a beam sweeping range related to the uncertainty may be set as an end point of the beam sweeping operation.

Referring to (a) of FIG. 14, an angle expected AoA may be set as an intermediate value of the beam sweeping range.

As described above, the range of the angle related to the beam sweeping (Beam sweeping range) may vary depending on the interpretation (or starting position) of the configured uncertainty value.

DL Angle Based Measurement

The base station or LMF delivers QCL information for the Rx beam included in PRS configuration to the UE when configuring the PRS resource. The UE receives the PRS through the indicated/configured Rx beam, but this may not be an optimal beam completely reflecting the location of the TRP. Accordingly, in relation to the configuration of the PRS resource, the LMF may transmit/configure/indicate additional information to the UE as follows.

The LMF may transmit/configure/indicate information for an Expected Tx beam (e.g. expected AoD/ZoD) for PRS transmission to the UE considering the previously measured location of the UE in the base station. In this case, the LMF may additionally provide range information (uncertainty) for the maximum guaranteed angle in addition to the expected Tx beam (expected AoD/ZoD) or expected Rx beam (expected AoA/ZoA).

In other words, information related to the PRS (transmitted from the base station/each TRP) may be transmitted/configured/indicated from the LMF to the UE. The information related to the PRS may include at least one of i) an expected angle (expected AoD/ZoD or expected AoA/ZoA) and/or ii) information about a range related to the expected angle (a range related to expected AoD/ZoD or a range related to expected AoA/ZoA). That is, the above-described angle-based search window may be configured based on the information related to the PRS.

Hereinafter, an example of configuring the angle-based search window will be described in detail with reference to (a) of FIG. 14.

The unit (granularity) of information (angle, angle range) included in the information related to the PRS may be configured to 1 degree. As an example, the range of expected AoD/AoA may be configured within [0, 60] with a step size of 1 degree. As an example, the range of expected ZoD/ZoA may be configured within [0, 30] with a step size of 1 degree.

Referring to (a) of FIG. 14, the information related to the PRS may include information on i) an expected angle and ii) a range related to the expected angle. The information on the expected angle (i.e. expected AoD/ZoD and/or expected AoA/ZoA) may indicate a median value of a range related to the expected angle ($\phi_{expected}^1/\phi_{expected}^2$ in (a) of FIG. 14). As an example, the information on the range related to the expected angle may indicate a size value of the corresponding range (beam sweeping range (uncertainty) in (a) of FIG. 14). As a specific example, when the size value is X, the range related to the expected angle may be defined/configured as follows.

[The Median Value−X/2 to the Median Value+X/2]

As part of DL-AoA enhancement, signaling of UL AoA/ZoA assistance information (expected UL-AoA/ZoA and uncertainty range) has been introduced.

On the other hand, in the case of DL angle-based positioning measurement, both DL AoD/ZoD (e.g. gNB viewpoint) and DL AoA/ZoA (e.g. UE viewpoint) are considered, and all options for DL position measurement are considered. Considering this point, it is desirable to introduce the expected UL-AoD/ZoD signaled from the location server (LMF) to the UE.

When the expected UL-AoD and uncertainty are clear to the UE (that is, when the UE determines the expected UL-AoD and uncertainty or receives information including the expected UL-AoD and uncertainty), the UE does not need to transmit all SRSs within the configured SRS resource(s). In addition, the expected UL-AoD and uncertainty may help the UE to determine Tx beamforming. FIG. 15 illustrates this operation.

Referring to FIG. 15, the uncertainty related to the expected UL-AoD may mean a range (beam sweeping range) of angles related to beam sweeping based on a reference direction (e.g. Reference directions #1 to #2) of a signal (e.g. PRS) transmitted by the TRP.

$\phi_{expected}^1$ and $\theta_{expected}^2$ of FIG. 15 exemplify expected UL-AoD/ZoD (AoA/ZoA), respectively, when reference directions are #1 to #2.

As an example, $\phi_{expected}^1$ may be expected UL-AoD (AoA). The beam sweeping range corresponding to the uncertainty may be determined by using $\phi_{expected}^1$ as an intermediate value.

As an example, $\theta_{expected}^2$ may be expected UL-ZoD (ZoA). The beam sweeping range corresponding to the uncertainty may be determined by using the $\theta_{expected}^2$ as a start point (end point) of the beam sweeping range.

The beam sweeping range is only an example, and does not mean that any one determination method is limitedly applied to a specific angle type (e.g. zenith angle or azimuth angle). As an example, the expected UL-ZoD (ZoA) ($\theta_{expected}^2$) may be defined/configured as an intermediate value of a beam sweeping range (uncertainty). For example, the expected UL-AoD (AoA)($\phi_{expected}^1$) may be defined as a value representing a start point (end point) of a beam sweeping range (uncertainty).

As described above, when the expected UL-AoD and uncertainty are configured in the UE, the UE does not need to transmit SRS based on all configured SRS resource(s), and the expected UL-AoD and uncertainty may help the UE to determine Tx beamforming.

When the expected UL-AoD/ZoD signaled from the location server (LMF) to the UE is supported by RAN1, configuration related to this may follow the configuration of expected UL-AoA and uncertainty (or details up to RAN2).

The uncertainty range of the expected UL AoD/ZoD may be defined as follows.

The range of the expected UL AoD (Azimuth angle of Departure) may be defined as (φAOD−ΔφAOD/2, φAOD+ΔφAOD/2). Here, φAOD is the expected azimuth angle of departure, and ΔφAOD is the uncertainty range for the expected azimuth angle of departure.

The range of the expected UL ZoD (Zenith angle of Departure) may be defined as (θZOD−ΔθAOA/2, θZOD+ΔθZOD/2). Here, ΘZOD is the expected zenith angle of departure, and ΔθZOD is the uncertainty range for the expected zenith angle of departure.

The above values may be configured based on a global coordination system (GCS) or a local coordination system (LCS). When the above values are configured based on the GCS, AoD and ZoD may be configured based on North or Zenith, respectively.

In addition to the above method, the location server (LMF) may directly configure a restriction on the SRS resource to the UE. As an example, the LMF may indicate/configure the priority for the SRS resource to the UE. The UE may perform SRS transmission only for some SRS resource(s) based on the priority.

Hereinafter, embodiments that can be applied to DL angle-based positioning measurement will be described.

The following Table 14 shows an agreement related to adjacent beam reporting.

TABLE 14

Agreement

For UE-assisted DL-AOD positioning method, to enhance the signaling to the UE for the purpose of PRS resource(s) reporting, the LMF may indicate in the assistance data (AD), one or both the following:
- option 1: subject to UE capability, for each PRS resource, a subset of PRS resources for the purpose of prioritization of DL-AOD reporting:
  - a UE may include the requested PRS measurement for the subset of the PRS in the DL-AoD additional measurements if the requested PRS measurement of the associated PRS is reported
    - The requested PRS measurement can be DL PRS RSRP and/or path PRS RSRP.
  - UE may report PRS measurements only for the subset of PRS resources.
  - Note: The subset associated with a PRS resource can be in a same or different PRS resource set than the PRS resource
- option 2: subject to UE capability, for each PRS resource, the boresight direction information.
- Note: Either case does not imply any restriction on UE measurement FFS: prioritization of the PRS resources and resource subsets to be measured It needs to be clearly determined whether the UE should always report all measurements for the PRS resource related to the subset. This may depend on the UE implementation method, in which case some priority rules should be defined.

For example, if the PRS resources in the subset are prioritized in descending or ascending order, the UE may report a measurement result for some PRS resources according to the priority. Considering the usefulness for LMF, the priority rule may be configured/used as follows. The LMF may indicate/configure a subset of PRS resources to the UE using priority rules such as descending/ascending order.

Hereinafter, embodiments related to the Expected uncertainty window will be described.

It was agreed that expected uncertainty is supported for DL-AoD improvement when considering advantages such as reducing Rx beam sweeping overhead or beamforming decision. The related agreements are shown in Table 15 below.

TABLE 15

Agreement

For the purpose of both UE-B and UE-A DL-AoD, and with regards to the support of AOD measurements with an expected uncertainty window, the following is supported
- Indication of expected angle value and uncertainty (of the expected azimuth and zenith angle value) range(s) is signaled by the LMF to the UE
- The type of expected angle and uncertainty can be requested by the UE, between the following options
  - Option 1: Indication of expected DL-AoD/ZoD value and uncertainty (of the expected DL-AoD/ZoD value) range(s) is signaled by the LMF to the UE
  - Option 2: Indication of expected DL-AoA/ZoA value and uncertainty (of the expected DL-AoA/ZoA value) range(s) is signaled by the LMF to the UE Referring to Table 15, the location server (LMF) may signal configuration information for supporting AOD measurement based on the expected uncertainty window to the UE. For example, the configuration information may include a first value (e.g. expected DL-AoD/ZoD value or expected DL-AoA/ZoA value) and a second value (e.g. uncertainty value related to the first value).

The remaining issue for expected DL-AoD/ZoD (AoA/ZoA) assistance information is a method of signaling the corresponding information to the UE. Details for signaling the expected DL-AoD/ZoD (AoA/ZoA) assistance information may follow the same approach as that of UL AoA/ZoA assistance information (e.g. expected value and uncertainty range). This may be desirable in terms of consistency.

For signaling of expected DL-AoD/ZoD (AoA/ZoA) assistance information related to DL-AoD enhancement, an embodiment based on the following Table 16 may be considered.

TABLE 16

Expected azimuth angle of arrival as ($\varphi$AOA − $\Delta\varphi$AOA/2, $\varphi$AOA + $\Delta\varphi$(AOA/2)
 $\varphi$AOA - expected azimuth angle of arrival, $\Delta\varphi$AOA - uncertainty range for expected azimuth angle of arrival
Expected zenith angle of arrival as ($\theta$AOA − $\Delta\theta$AOA/2, $\theta$AOA + $\Delta\theta$AOA/2)
 $\theta$AOA - expected zenith angle of arrival, $\Delta\theta$AOA - uncertainty range for expected zenith angle of arrival
Expected azimuth angle of departure as ($\varphi$AOD − $\Delta\varphi$AOD/2, $\varphi$AOD + $\Delta\varphi$AOD/2)
 $\varphi$AOD - expected azimuth angle of departure, $\Delta\varphi$AOD - uncertainty range for expected azimuth angle of departure
Expected zenith angle of departure as ($\theta$AOD − $\Delta\theta$AOD/2, $\theta$AOD + $\Delta\theta$AOD/2)
 $\theta$AOD - expected zenith angle of departure, $\Delta\theta$AOD - uncertainty range for expected zenith angle of departure
Both GCS and LCS are supported for DL-AoA/ZoA and DL-AoD/ZoD assistance information indication.
Granularity of 0.1 degrees is applied for the expected AoA ($\varphi$AOA), expected ZoA ($\theta$ZOA) and the corresponding uncertainty values
Granularity of 0.1 degrees is applied for the expected AoD ($\varphi$AOD), expected ZoD ($\theta$ZOD) and the corresponding uncertainty values Referring to Table 16, the range of the expected angle may be defined/determined by the first value and the second value. The first value may include i) $\varphi$AOA and $\theta$AOA or ii) $\varphi$AOD and $\theta$AOD. The second value may include i) $\Delta\varphi$AOA and $\Delta\theta$AOA or ii) $\Delta\varphi$AOD and $\Delta\theta$AOD.

The expected DL AoA (Azimuth angle of Arrival) range may be defined as ($\varphi$AOA−$\Delta\varphi$AOA/2, $\varphi$AOA+$\Delta\varphi$AOA/2). Here, $\varphi$AOA is the expected azimuth angle of arrival, and $\Delta\varphi$AOA is the uncertainty range for the expected azimuth angle of arrival.

The range of expected DL ZoA (zenith angle of arrival) may be defined as ($\theta$AOA−$\Delta\theta$AOA/2, $\theta$AOA+$\Delta\theta$AOA/2). Here, $\theta$AOA is the expected zenith angle of arrival, and $\Delta\theta$AOA is the uncertainty range for the expected zenith angle of arrival.

The range of expected DL AoD (Azimuth angle of Departure) may be defined as ($\varphi$AOD−$\Delta\varphi$AOD/2, $\varphi$AOD+$\Delta\varphi$AOD/2). Here, $\varphi$AOD is the expected azimuth angle of departure, and $\Delta\varphi$AOD is the uncertainty range for the expected azimuth angle of departure.

The range of expected DL ZoD (Zenith angle of Departure) may be defined as ($\theta$AOD−$\Delta\theta$AOD/2, $\theta$AOD+$\Delta\theta$AOD/2). Here, $\theta$AOD is the expected zenith angle of departure, and $\Delta\theta$AOD is the uncertainty range for the expected zenith angle of departure.

The first value and the second value may be indicated/configured based on the global coordinate system (GCS) or the local coordinate system (LCS). In addition, the first value and the second value may be configured in a predefined angular unit.

A boundary value of the range of the expected angle may be determined based on the first value and the second value.

For example, a first boundary value (e.g. an upper limit value or a lower limit value of the range) of the range of the expected angle may be a value obtained by subtracting ½ of the second value from the first value (e.g. $\varphi$AOA−$\Delta\varphi$AOA/2, $\theta$AOA−$\Delta\theta$AOA/2, $\varphi$AOD−$\Delta\varphi$AOD/2 or $\theta$AOD−$\Delta\theta$AOD/2).

For example, a second boundary value (e.g. an upper limit value or a lower limit value of the range) of the range of the expected angle may be determined as a value obtained by adding ½ of the second value to the first value (e.g. $\varphi AOA+\Delta\varphi AOA/2$, $\theta AOA+\Delta\theta AOA/2$, $\varphi AOD+\Delta\varphi AOD/2$ or $\theta AOD+\Delta\theta AOD/2$).

Also, since the assistance information may be used to determine a LoS/NLos path, the assistance information may also be useful for a timing-based positioning method. Considering this, signaling of assistance information (expected value and uncertainty range) for DL AoA/ZoA and DL-AoD/ZoD may also be supported for DL-TDOA and multiple RTT positioning methods.

The methods and rules described in the present disclosure may be applied to all positioning methods of all UL/DL+UL, and the above-described SRS may include SRS for MIMO as well as SRS for positioning.

The methods and rules described in the present disclosure may be extended and applied to artificial intelligence (AI)/machine learning (ML).

The methods and rules described in the present disclosure may be applied regardless of an RRC state (e.g. RRC connected state/RRC idle state/RRC inactive state).

The methods and rules described in the present disclosure may be extended and applied to timing-based positioning measurement and hybrid positioning measurement as well as angle-based positioning measurement.

In terms of implementation, operations (e.g. operations related to positioning measurement) of the UE/base station/location server according to the above-described embodiments may be processed by the device of FIGS. 20 to 24 (e.g. processors 102 and 202 in FIG. 21) to be described later.

Figure 21:
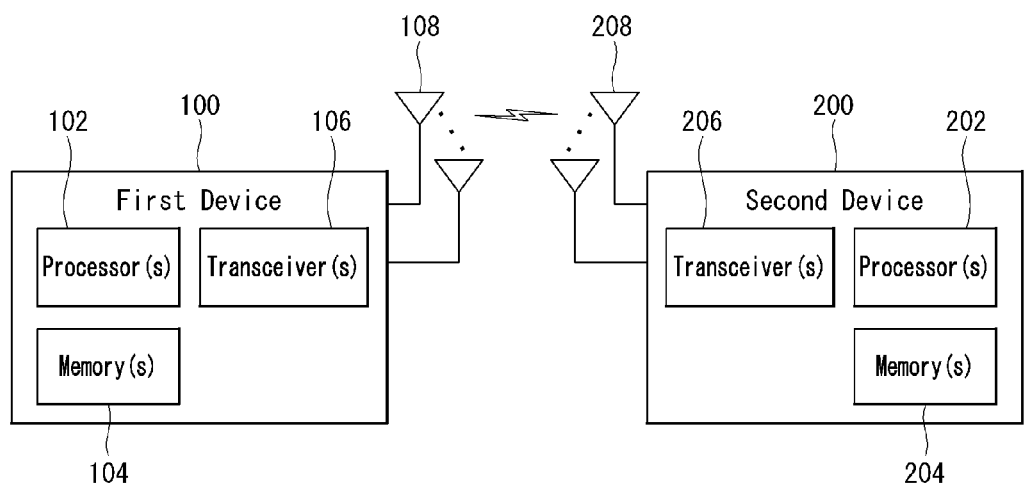
FIG. 21 illustrates wireless devices applicable to the present disclosure.

In addition, the operations (e.g. operations related to positioning measurement) of the UE/base station/location server according to the above-described embodiment may be stored in the memory (e.g. 104 and 204 of FIG. 21) in the form of instructions/programs (e.g. instruction, executable code) for driving at least one processor (e.g. 102 and 202 in FIG. 21).

Hereinafter, operations of a UE, a base station (TRP), and a location server (LMF) to which the above-described embodiments can be combined and applied will be described in detail with reference to FIGS. 16 and 17.

Figure 16:
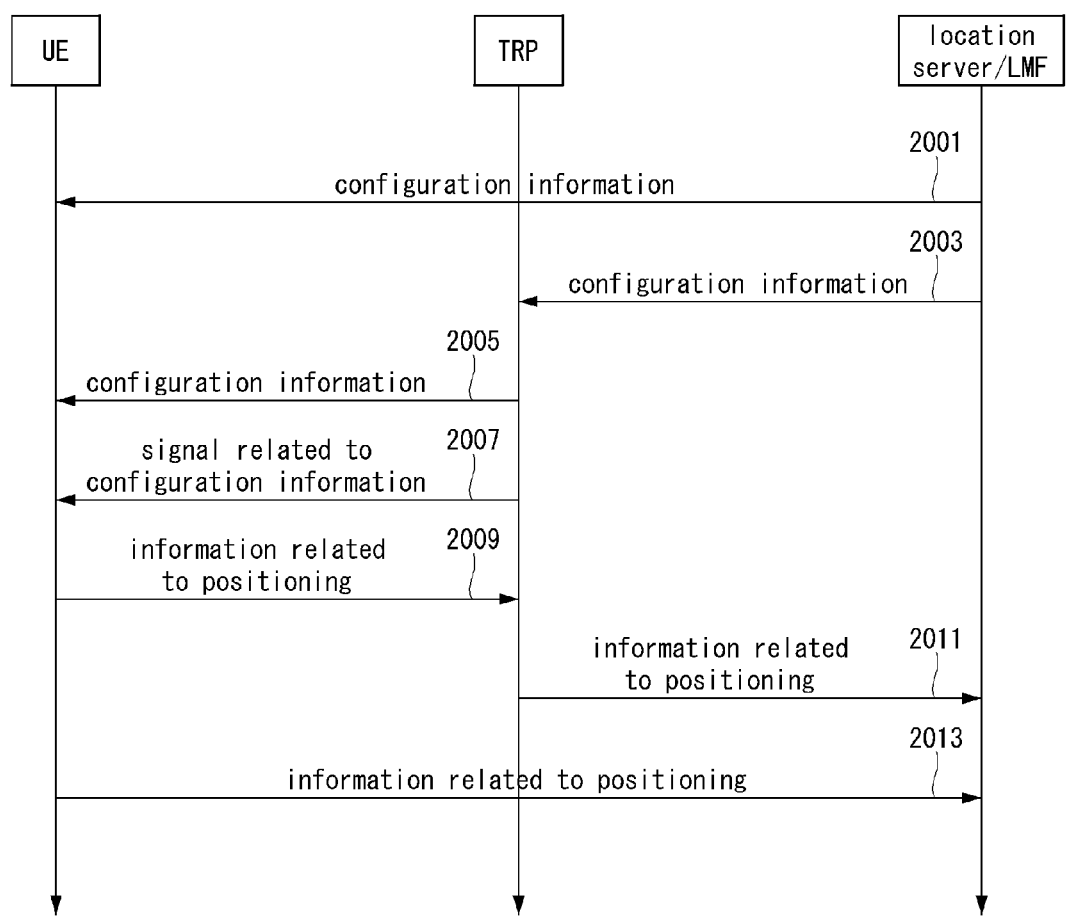
FIG. 16 is a diagram illustrating operations of a UE, TRP, and LMF to which a method proposed in the present disclosure can be applied.

FIG. 16 is a diagram illustrating operations of a UE, TRP, and LMF to which a method proposed in the present disclosure can be applied.

Referring to FIG. 16, in operation 2001 according to an exemplary embodiment, the location server and/or the LMF may transmit configuration information to the UE, and the UE may receive it.

Meanwhile, in operation 2003 according to an exemplary embodiment, the location server and/or the LMF may transmit reference configuration information to a transmission and reception point (TRP), and the TRP may receive it. In operation 2005 according to an exemplary embodiment, the TRP may transmit reference configuration information to the UE, and the UE may receive it. In this case, the operation 2001 according to the exemplary embodiment may be omitted.

Conversely, the operations 2003 and 2005 according to an exemplary embodiment may be omitted. In this case, the operation 2001 according to the exemplary embodiment may be performed.

That is, the operations 2001 according to an exemplary embodiment and the operations 2003 and 2005 according to an exemplary embodiment may be optional.

In operation 2007 according to an exemplary embodiment, the TRP may transmit a signal related to configuration information to the UE, and the UE may receive it. For example, the signal related to the configuration information may be a signal for positioning of the UE.

In operation 2009 according to an exemplary embodiment, the UE may transmit a signal related to positioning to the TRP, and the TRP may receive it. In operation 2011 according to an exemplary embodiment, the TRP may transmit the signal related to positioning to the location server and/or the LMF, and the location server and/or the LMF may receive it.

Meanwhile, in operation 2013 according to an exemplary embodiment, the UE may transmit the signal related to positioning to the location server and/or the LMF, and the location server and/or the LMF may receive it. In this case, operations 2009 and 2011 according to the exemplary embodiment may be omitted.

Conversely, operation 2013 according to an exemplary embodiment may be omitted. In this case, operations 2009 and 2011 according to the exemplary embodiment may be performed.

That is, operations 2009 and 2011 according to an exemplary embodiment and operations 2013 according to an exemplary embodiment may be optional.

In an exemplary embodiment, the signal related to positioning may be obtained based on the configuration information and/or the signal related to the configuration information.

Figure 17:
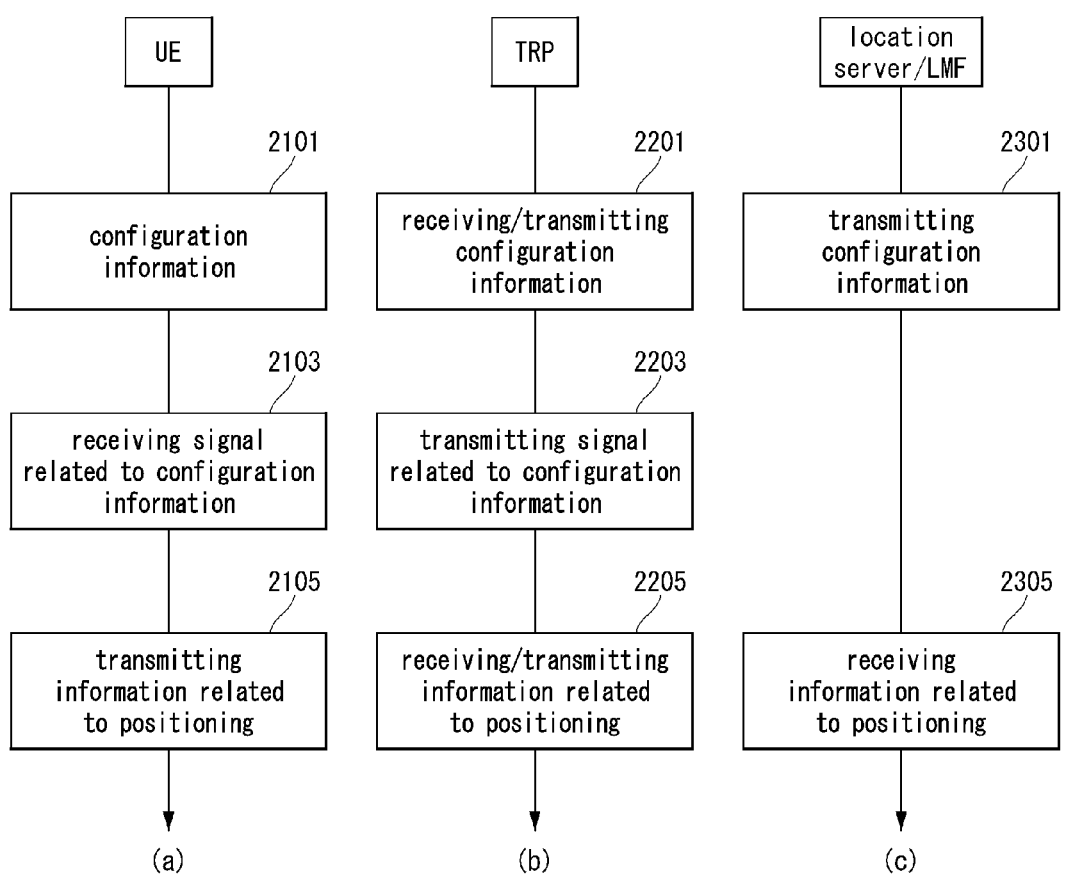
FIG. 17 is a flowchart for explaining an operation of each UE, TRP and LMF to which a method proposed in the present disclosure can be applied.

FIG. 17 is a flowchart for explaining an operation of each UE, TRP and LMF to which a method proposed in the present disclosure can be applied.

Referring to (a) of FIG. 17, in operation 2101 according to an exemplary embodiment, the UE may receive configuration information. In operation 2103 according to an exemplary embodiment, the UE may receive a signal related to configuration information. In operation 2105 according to an exemplary embodiment, the UE may transmit information related to positioning.

Referring to (b) of FIG. 17, in operation 2201 according to an exemplary embodiment, the TRP may receive configuration information from the location server and/or the LMF, and may transmit it to the UE. In operation 2203 according to an exemplary embodiment, the TRP may transmit the signal related to configuration information. In operation 2205 according to an exemplary embodiment, the TRP may receive information related to positioning, and may transmit it to the location server and/or the LMF.

Referring to (c) of FIG. 17, in operation 2301 according to an exemplary embodiment, the location server and/or the LMF may transmit the configuration information. In operation 2305 according to an exemplary embodiment, the location server and/or the LMF may receive the information related to positioning.

More specific operations, functions, terms, etc. in the operation according to each exemplary embodiment may be performed and described in combination with at least one of the various embodiments described above and the embodiments to be described later.

Hereinafter, the above-described embodiments (FIGS. 7 to 17) will be described in detail with reference to FIG. 18 in terms of the operation of the UE. Methods to be described below are divided for convenience of description, unless mutually excluded, and of course, some components of any one method may be substituted with some components of another method, or may be applied in combination with each other.

Figure 18:
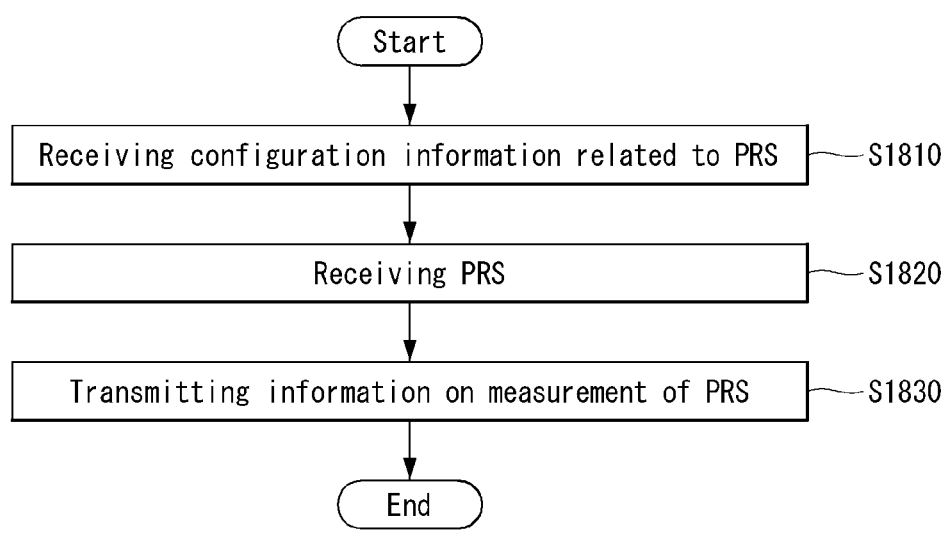
FIG. 18 is a flowchart illustrating a method for a UE to transmit information on measurement of PRS in a wireless communication system according to an embodiment of the present disclosure.

FIG. 18 is a flowchart illustrating a method for a UE to transmit information on measurement of PRS in a wireless communication system according to an embodiment of the present disclosure.

Referring to FIG. 18, a method for a UE to transmit information on measurement of a Positioning Reference Signal (PRS) in a wireless communication system according to an embodiment of the present disclosure may include receiving configuration information related to the PRS (S1810), receiving the PRS (S1820), and transmitting the information on measurement of the PRS (S1830).

In S1810, the UE receives the configuration information related to the PRS from the location server. For example, the location server may refer to a Location Management Function (LMF) of FIG. 7. The S1810 may be based on the operation according to 2001 or 2003 and 2005 of FIG. 16 and the operation 2101 of FIG. 17. That is, the configuration information related to the PRS may be i) directly transmitted from the location server to the UE, or ii) transmitted from the location server to the UE through the base station (TRP).

For example, the configuration information related to the PRS may include a DL PRS resource set and/or a DL-PRS-Resource, which are higher layer parameters based on Table 7 above. However, the present disclosure is not limited thereto, and the configuration information related to the PRS may further include other higher layer parameters defined in Table 7 above.

For example, the configuration information related to the PRS may be based on assistance information (e.g. ProvideAssistanceData) provided to the UE through an LPP message. The assistance information may include assistance information (e.g. commonIEsProvideAssistanceData) related to a common IE (Common Information Element) applicable to one or more positioning methods. The assistance information related to the common IE may include assistance data related to PRS (e.g. NR-DL-PRS-AssistanceData).

Base on an embodiment, the configuration information may include information on an angle related to the PRS.

The information for the angle related to the PRS may include i) a first value related to an expected angle and ii) a second value related to a range of the expected angle. This embodiment may be based on Table 16 described above.

A boundary value of the range of the expected angle may be determined based on the first value and the second value. For example, a first boundary value of the range of the expected angle may be determined as a value obtained by subtracting ½ of the second value from the first value. For example, a second boundary value of the range of the expected angle may be determined as a value obtained by adding ½ of the second value to the first value.

According to an embodiment, the first value may include i) a value related to azimuth angle of arrival (AoA) and a value related to zenith angle of arrival (ZoA) or ii) a value related to azimuth angle of departure (AoD) and a value related to zenith angle of departure (ZoD). In this case, the second value may include i) a value representing a range of the value related to the AoA and a value representing a range of the value related to the ZoA, or ii) a value representing a range of the value related to the AoD and a value representing a range of the value related to the ZoD.

According to an embodiment, the first value and the second value may be based on a global coordinate system (GCS) or a local coordinate system (LCS).

The first value and the second value may be configured/defined as a value greater than or equal to 0. That is, each of the first value and the second value is not configured to a negative number and may be configured to a value equal to or greater than zero. For example, in the case of azimuth, the first value (e.g. φAOA or φAOD) may be configured to a value of 0 or more and 359 or less, and the second value (e.g. ΔφAOA or ΔφAOD) may configured to a value of 0 or more and 60 or less. For example, in the case of the zenith angle, the first value (e.g. θAOA or θAOD) may be configured to a value of 0 or more and 180 or less, and the second value (e.g. ΔθAOA or ΔθAOD) may be configured to a value of 0 or more and 30 or less.

According to an embodiment, granularity related to the first value and the second value may be based on a predefined angle value. For example, the first value and the second value may be configured in a predefined angular unit (e.g. a unit of 1 degree). For example, the granularity may be defined as a value based on Table 16. In this case, the first value and the second value may be configured in a unit of 0.1 degree.

Embodiments based on Table 16 described above may be applied to improve the angle-based positioning method, but are not limited thereto. According to an embodiment, the information for the angle related to the PRS may be applied to a predefined positioning method. The predefined positioning method may include at least one of i) a downlink-angle of departure (DL-AoD)-based positioning method, ii) a downlink-time difference of arrival (DL-TDOA)-based positioning method and/or iii) a multi-round trip time (Multi-RTT)-based positioning method.

Based on an embodiment, signaling (S1810) between the UE and the location server may be performed based on a protocol for positioning. For example, the configuration information related to the PRS may be received based on an LTE Positioning Protocol (LPP) message. The information for the angle of the PRS may be information (e.g. NR-DL-PRS-AssistanceData) included in commonIEsProvideAssistanceData of the ProvideAssistanceData in the LPP message.

Based on S1810 described above, the operation of the UE (100/200 in FIGS. 20 to 24) receiving the configuration information related to the PRS from the location server (100/200 in FIGS. 20 to 24) may be implemented by the device of FIGS. 20 to 24. For example, referring to FIG. 21, the one or more processors 102 may control one or more transceivers 106 and/or one or more memories 104 to receive the configuration information related to the PRS from the location server 200.

In S1820, the UE receives the PRS from the base station. For example, the base station may be based on a reference source (e.g. a transmission and reception point (TRP)) of FIG. 7, and the PRS may be based on the radio signals of FIG. 7. The S1820 may be based on the operation according to 2007 of FIG. 16, and the operation 2103 of FIG. 17. The reception of the PRS may be performed as defined in Tables 6 and 7 above.

Based on S1820 described above, the operation of the UE (100/200 in FIGS. 20 to 24) receiving the PRS from the base station (100/200 in FIGS. 20 to 24) may be implemented by the device of FIGS. 20 to 24. For example, referring to FIG. 21, the one or more processors 102 may control one or more transceivers 106 and/or one or more memories 104 to receive the PRS from base station 200.

In S1830, the UE transmits information on the measurement of the PRS to the location server. The S1830 may be based on the operation according to 2009, 2011, or 2013 of FIG. 16 and the operation 2105 of FIG. 17. That is, the information on the measurement of the PRS may be i)

transmitted directly from the UE to the location server, or ii) transmitted from the UE to the location server through the base station (TRP).

Transmission of information on the measurement of the PRS may be performed as defined in Table 7 above. For example, the information on the measurement of the PRS may include a Reference Signal Time Difference (RSTD) related to the PRS and/or a Reference Signal Received Power (RSRP) related to the PRS.

Based on an embodiment, signaling (S1830) between the UE and the location server may be performed based on a protocol for positioning. For example, the information on the measurement of the PRS may be transmitted based on an LTE Positioning Protocol (LPP).

Based on S1830 described above, the operation of the UE (100/200 in FIGS. 20 to 24) transmitting information on the measurement of the PRS to the location server (100/200 in FIGS. 20 to 24) may be implemented by the device of FIGS. 20 to 24. For example, referring to FIG. 21, the one or more processors 102 may control one or more transceivers 106 and/or one or more memories 104 to transmit the information on the measurement of the PRS to the location server 200.

Hereinafter, the above-described embodiments (FIGS. 7 to 17) will be described in detail with reference to FIG. 19 in terms of the operation of the location server. Methods to be described below are divided for convenience of description, unless mutually excluded, and of course, some components of any one method may be substituted with some components of another method, or may be applied in combination with each other.

Figure 19:
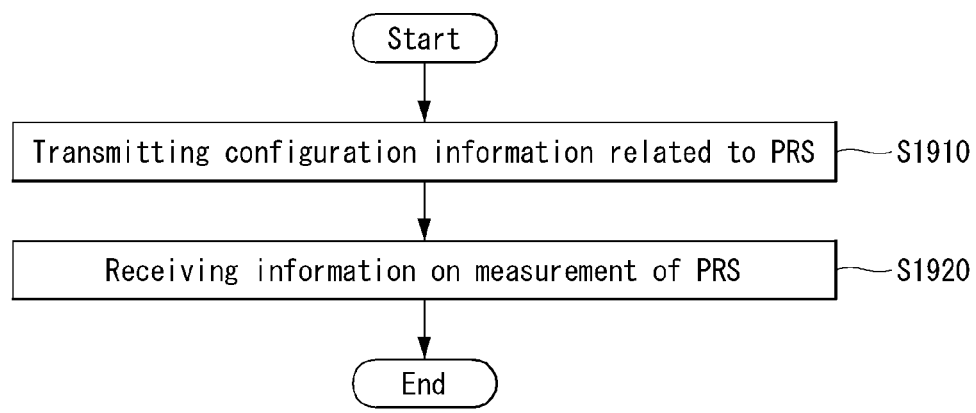
FIG. 19 is a flowchart illustrating a method for a location server to receive information on measurement of PRS in a wireless communication system according to another embodiment of the present disclosure.

FIG. 19 is a flowchart illustrating a method for a location server to receive information on measurement of PRS in a wireless communication system according to another embodiment of the present disclosure.

Referring to FIG. 19, a method for a location server to receive information on measurement of a Positioning Reference Signal (PRS) in a wireless communication system according to another embodiment of the present disclosure may include transmitting configuration information related to the PRS (S1910) and receiving information on the measurement of the PRS (S1920).

In S1910, the location server transmits the configuration information related to the PRS to the UE. For example, the UE may refer to the target device of FIG. 7. The S1910 may be based on the operation according to 2001 or 2003 and 2005 of FIG. 16 and the operation 2301 of FIG. 17. That is, the configuration information related to the PRS may be i) directly transmitted from the location server to the UE, or ii) transmitted from the location server to the UE through the base station (TRP).

The PRS is transmitted from the base station to the UE. For example, the base station may be based on a reference source (e.g. a transmission and reception point (TRP)) of FIG. 7, and the PRS may be based on the radio signals of FIG. 7. Transmission of the PRS by the base station may be performed as defined in Tables 6 and 7 above.

For example, the configuration information related to the PRS may include a DL PRS resource set and/or a DL-PRS-Resource, which are higher layer parameters based on Table 7 above. However, present disclosure is not limited thereto, and the configuration information related to the PRS may further include other higher layer parameters defined in Table 7 above.

For example, the configuration information related to the PRS may be based on assistance information (e.g. ProvideAssistanceData) provided to the UE through an LPP message. The assistance information may include assistance information (e.g. commonIEsProvideAssistanceData) related to a common IE (Common Information Element) applicable to one or more positioning methods. The assistance information related to the common IE may include assistance data related to PRS (e.g. NR-DL-PRS-AssistanceData).

Base on an embodiment, the configuration information may include information on an angle related to the PRS.

The information for the angle related to the PRS may include i) a first value related to an expected angle and ii) a second value related to a range of the expected angle. This embodiment may be based on Table 16 described above.

A boundary value of the range of the expected angle may be determined based on the first value and the second value. For example, a first boundary value of the range of the expected angle may be determined as a value obtained by subtracting ½ of the second value from the first value. For example, a second boundary value of the range of the expected angle may be determined as a value obtained by adding ½ of the second value to the first value.

According to an embodiment, the first value may include i) a value related to azimuth angle of arrival (AoA) and a value related to zenith angle of arrival (ZoA) or ii) a value related to azimuth angle of departure (AoD) and a value related to zenith angle of departure (ZoD). In this case, the second value may include i) a value representing a range of the value related to the AoA and a value representing a range of the value related to the ZoA, or ii) a value representing a range of the value related to the AoD and a value representing a range of the value related to the ZoD.

According to an embodiment, the first value and the second value may be based on a global coordinate system (GCS) or a local coordinate system (LCS).

The first value and the second value may be configured/defined as a value greater than or equal to 0. That is, each of the first value and the second value is not configured to a negative number and may be configured to a value equal to or greater than zero. For example, in the case of azimuth, the first value (e.g. $\varphi AOA$ or $\varphi AOD$) may be configured to a value of 0 or more and 359 or less, and the second value (e.g. $\Delta\varphi AOA$ or $\Delta\varphi AOD$) may configured to a value of 0 or more and 60 or less. For example, in the case of the zenith angle, the first value (e.g. $\theta AOA$ or $\theta AOD$) may be configured to a value of 0 or more and 180 or less, and the second value (e.g. $\Delta\theta AOA$ or $\Delta\theta AOD$) may be configured to a value of 0 or more and 30 or less.

According to an embodiment, granularity related to the first value and the second value may be based on a predefined angle value. For example, the first value and the second value may be configured in a predefined angular unit (e.g. a unit of 1 degree). For example, the granularity may be defined as a value based on Table 16. In this case, the first value and the second value may be configured in a unit of 0.1 degree.

Embodiments based on Table 16 described above may be applied to improve the angle-based positioning method, but are not limited thereto. According to an embodiment, the information for the angle related to the PRS may be applied to a predefined positioning method. The predefined positioning method may include at least one of i) a downlink-angle of departure (DL-AoD)-based positioning method, ii) a downlink-time difference of arrival (DL-TDOA)-based positioning method and/or iii) a multi-round trip time (Multi-RTT)-based positioning method.

Base on an embodiment, signaling (S1910) between the location server and the UE may be performed based on a protocol for positioning. For example, the configuration information related to the PRS may be received based on an LTE Positioning Protocol (LPP) message. The information for the angle of the PRS may be information (e.g. NR-DL-PRS-AssistanceData) included in commonIEsProvideAssistanceData of the ProvideAssistanceData in the LPP message.

Base on S1910 described above, the operation of the location server (100/200 in FIGS. 20 to 24) transmitting the configuration information related to the PRS to the UE (100/200 in FIGS. 20 to 24) may be implemented by the device of FIGS. 20 to 24. For example, referring to FIG. 21, the one or more processors 202 may control one or more transceivers 206 and/or one or more memories 204 to transmit the configuration information related to the PRS to the UE 100.

In S1920, the location server receives information on the measurement of the PRS from the UE. The S1920 may be based on the operation according to 2009, 2011, or 2013 of FIG. 16 and the operation 2305 of FIG. 17. That is, the information on the measurement of the PRS may be i) transmitted directly from the UE to the location server, or ii) transmitted from the UE to the location server through the base station (TRP).

Reception of information on the measurement of the PRS may be performed as defined in Table 7 above. For example, the information on the measurement of the PRS may include a Reference Signal Time Difference (RSTD) related to the PRS and/or a Reference Signal Received Power (RSRP) related to the PRS.

Base on an embodiment, signaling (S1920) between the location server and the UE may be performed based on a protocol for positioning. For example, the information on the measurement of the PRS may be received based on an LTE Positioning Protocol (LPP).

Base on S1920 described above, the operation of the location server (100/200 in FIGS. 20 to 24) receiving information on the measurement of the PRS from the UE (100/200 in FIGS. 20 to 24) may be implemented by the device of FIGS. 20 to 24. For example, referring to FIG. 21, the one or more processors 202 may control one or more transceivers 206 and/or one or more memories 204 to receive the information on the measurement of the PRS from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
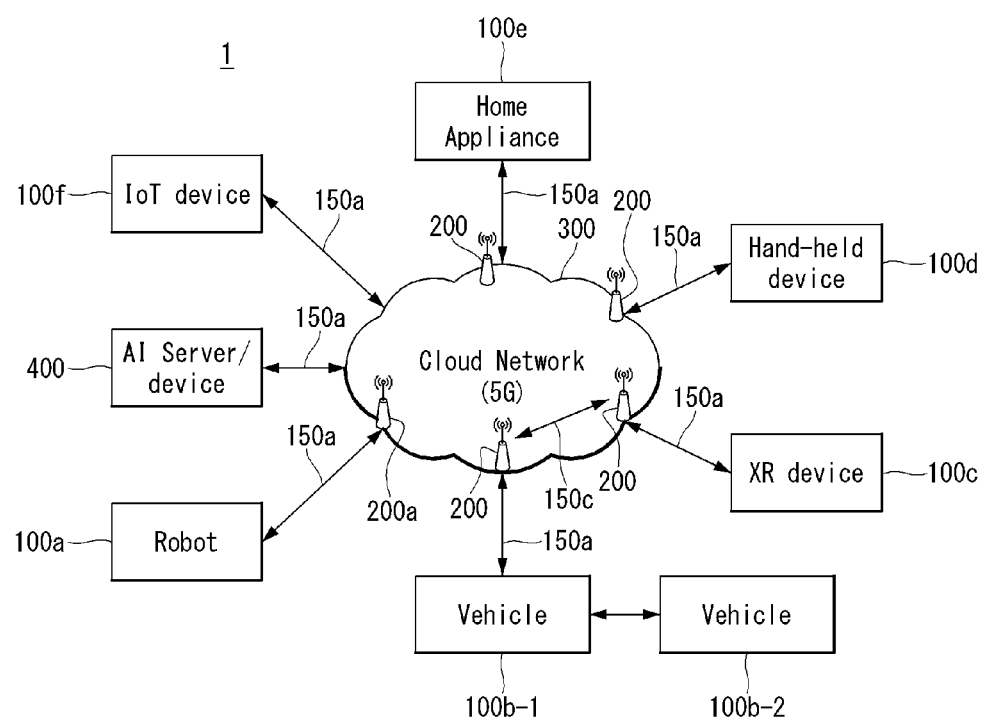
FIG. 20 illustrates a communication system 1 applied to the present disclosure.

FIG. 20 illustrates a communication system 1 applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

Figure 22:
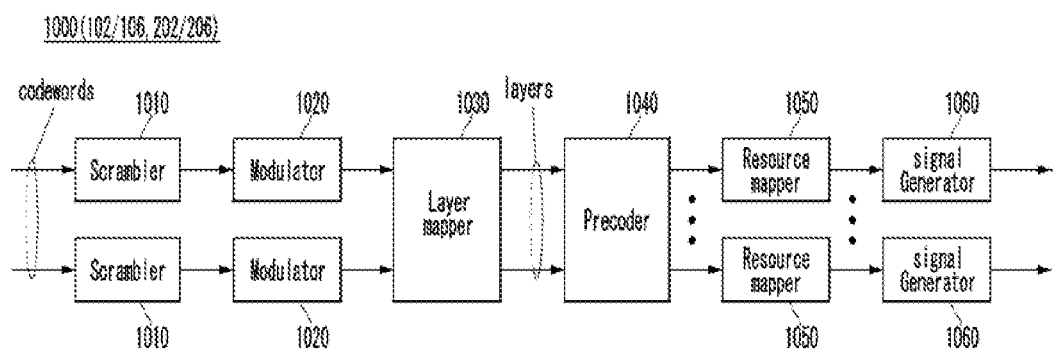
FIG. 22 illustrates a signal process circuit for a transmission signal.

FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

Figure 23:
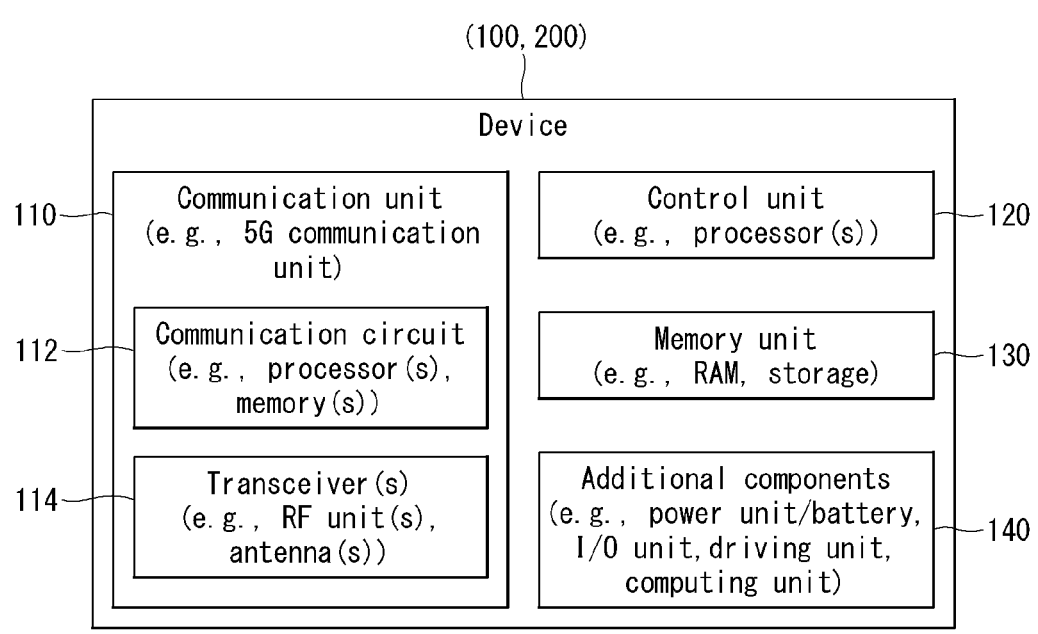
FIG. 23 illustrates another example of a wireless device applied to the present disclosure.

FIG. 23 illustrates another example of a wireless device applied to the present disclosure.

The wireless device may be implemented in various forms according to a use-case/service (refer to FIG. 20). Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

Figure 24:
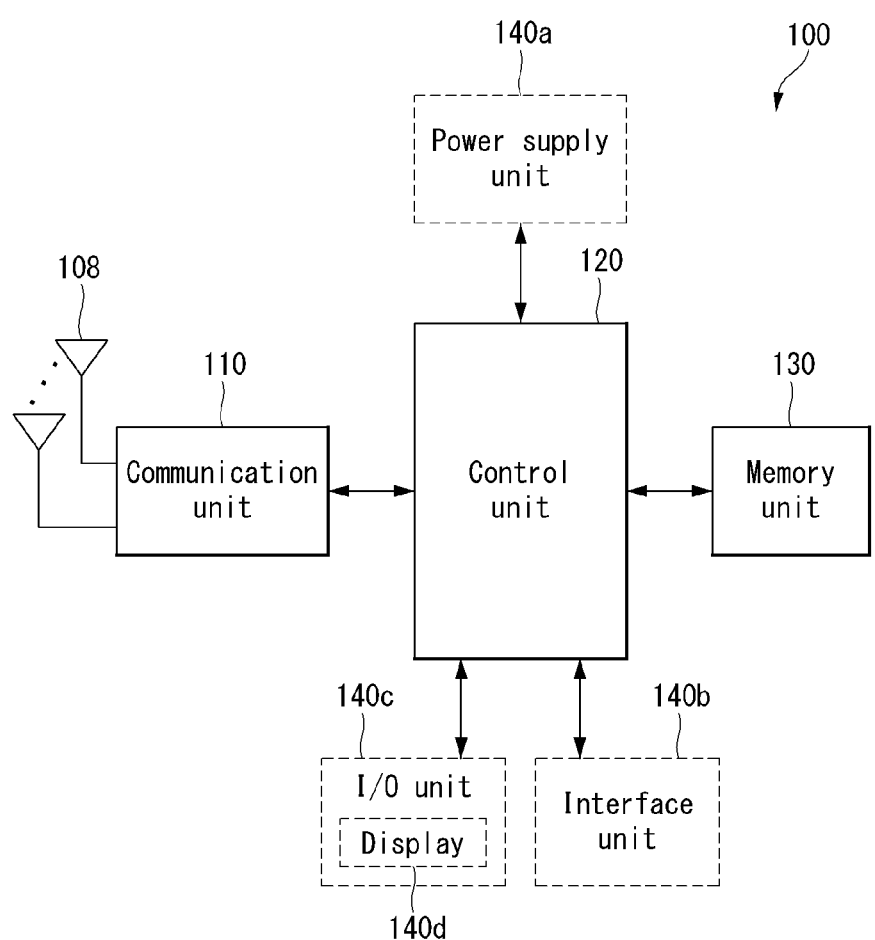
FIG. 24 illustrates a hand-held device applied to the present disclosure.

FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Here, the wireless communication technology implemented in the device (FIGS. 20 to 24) of the present disclosure may include LTE, NR, and 6G as well as Narrowband Internet of Things (NB-IoT) for low-power communication. For example, the NB-IoT technology may be an example of a LPWAN (Low Power Wide Area Network) technology, and may be implemented in standards such as LTE Cat NB1 and/or LTE Cat NB2, and is not limited to the above-described name.

Additionally or alternatively, the wireless communication technology implemented in the device (FIGS. 20 to 24) of the present disclosure may perform communication based on the LTE-M technology. For example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name.

Additionally or alternatively, the wireless communication technology implemented in the device (FIGS. 20 to 24) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for a user equipment to transmit information for measurement of a positioning reference signal (PRS) in a wireless communication system, the method comprising:
receiving, from a location server, configuration information related to the PRS;
receiving the PRS from a base station; and
transmitting, to the location server, information for a measurement of the PRS,
wherein the configuration information includes information for an angle related to the PRS,
wherein the information for the angle related to the PRS includes i) a first value related to an expected angle and ii) a second value related to a range of the expected angle, and
wherein a boundary value of the range of the expected angle is determined based on the first value and the second value.

2. The method of claim 1, wherein a first boundary value of the range of the expected angle is determined as a value obtained by subtracting ½ of the second value from the first value.

3. The method of claim 1, wherein a second boundary value of the range of the expected angle is determined as a value obtained by adding ½ of the second value to the first value.

4. The method of claim 1, wherein the first value includes i) a value related to azimuth angle of arrival (AoA) and a value related to zenith angle of arrival (ZoA) or ii) a value related to azimuth angle of departure (AoD) and a value related to zenith angle of departure (ZoD).

5. The method of claim 4, wherein the second value includes i) a value representing a range of the value related to the AoA and a value representing a range of the value related to the ZoA, or ii) a value representing a range of the value related to the AoD and a value representing a range of the value related to the ZoD.

6. The method of claim 1, wherein the first value and the second value are based on a global coordinate system (GCS) or a local coordinate system (LCS).

7. The method of claim 1, wherein the first value and the second value are configured in a predefined angular unit.

8. The method of claim 1, wherein the information for the angle related to the PRS is applied to a predefined positioning method, and
wherein the predefined positioning method includes at least one of i) a downlink-angle of departure (DL-AoD)-based positioning method, ii) a downlink-time difference of arrival (DL-TDOA)-based positioning method and/or iii) a multi-round trip time (Multi-RTT)-based positioning method.

9. The method of claim 7, wherein the configuration information related to the PRS is received based on an LTE positioning protocol (LPP) message.

10. A user equipment (UE) transmitting information for measurement of a positioning reference signal (PRS) in a wireless communication system, the UE comprising:
one or more transceivers;
one or more processors controlling the one or more transceivers; and
one or more memories operably connected to the one or more processors,
the one or more memories store instructions for performing operations based on being executed by the one or more processors,
the operations comprise:
receiving, from a location server, configuration information related to the PRS;
receiving the PRS from a base station; and
transmitting, to the location server, information for a measurement of the PRS,
wherein the configuration information includes information for an angle related to the PRS, wherein the information for the angle related to the PRS includes i) a first value related to an expected angle and ii) a second value related to a range of the expected angle, and wherein a boundary value of the range of the expected angle is determined based on the first value and the second value.

11. A location server receiving information for measurement of a positioning reference signal (PRS) in a wireless communication system, the location server comprising:
one or more transceivers;
one or more processors controlling the one or more transceivers; and
one or more memories operably connected to the one or more processors,
the one or more memories store instructions for performing operations based on being executed by the one or more processors,
the operations comprise:
transmitting, to a user equipment (UE), configuration information related to the PRS, wherein the PRS is transmitted from a base station to the UE; and
receiving, from the UE, information for a measurement of the PRS,
wherein the configuration information includes information for an angle related to the PRS,
wherein the information for the angle related to the PRS includes i) a first value related to an expected angle and ii) a second value related to a range of the expected angle, and
wherein a boundary value of the range of the expected angle is determined based on the first value and the second value.

12. The location server of claim 11, wherein a first boundary value of the range of the expected angle is determined as a value obtained by subtracting ½ of the second value from the first value.

13. The location server of claim 11, wherein a second boundary value of the range of the expected angle is determined as a value obtained by adding ½ of the second value to the first value.

14. The location server of claim 11, wherein the first value includes i) a value related to azimuth angle of arrival (AoA) and a value related to zenith angle of arrival (ZoA) or ii) a value related to azimuth angle of departure (AoD) and a value related to zenith angle of departure (ZoD).

15. The location server of claim 14, wherein the second value includes i) a value representing a range of the value related to the AoA and a value representing a range of the value related to the ZoA, or ii) a value representing a range of the value related to the AoD and a value representing a range of the value related to the ZoD.

16. The location server of claim 11, wherein the first value and the second value are based on a global coordinate system (GCS) or a local coordinate system (LCS).

17. The location server of claim 11, wherein the first value and the second value are configured in a predefined angular unit.

18. The location server of claim 11, wherein the information for the angle related to the PRS is applied to a predefined positioning method, and
wherein the predefined positioning method includes at least one of i) a downlink-angle of departure (DL-AoD)-based positioning method, ii) a downlink-time difference of arrival (DL-TDOA)-based positioning method and/or iii) a multi-round trip time (Multi-RTT)-based positioning method.

19. The location server of claim 17, wherein the configuration information related to the PRS is received based on an LTE positioning protocol (LPP) message.

* * * * *